(12) United States Patent
Graham et al.

(10) Patent No.: US 6,619,342 B2
(45) Date of Patent: Sep. 16, 2003

(54) WHEEL STOP SERVICE PORT

(75) Inventors: John David Trevor Graham, Vancouver (CA); David Michael Routtenberg, Surrey (CA); William Edward Mufford, Langley (CA); Darren Scott Sokoloski, Vancouver (CA); Alan John Mulvenna, North Vancouver (CA)

(73) Assignee: General Hydrogen Corporation, Richmond (CA)

( * ) Notice: Subject to any disclaimer, the term of this patent is extended or adjusted under 35 U.S.C. 154(b) by 0 days.

(21) Appl. No.: 10/144,258

(22) Filed: May 10, 2002

(65) Prior Publication Data

US 2003/0075235 A1 Apr. 24, 2003

Related U.S. Application Data

(60) Provisional application No. 60/347,585, filed on Jan. 10, 2002, and provisional application No. 60/290,587, filed on May 11, 2001.

(51) Int. Cl.[7] ............................................... B67D 5/00
(52) U.S. Cl. ......................... 141/231; 141/94; 141/98; 191/4
(58) Field of Search ...................... 141/94, 98, 231; 191/4

(56) References Cited

U.S. PATENT DOCUMENTS

| | | | |
|---|---|---|---|
| 3,678,972 A | 7/1972 | Swindler | 141/387 |
| 3,742,421 A | 6/1973 | Van Rooijen | 338/180 |
| 3,893,480 A | 7/1975 | Dunbar | 137/615 |
| 4,158,802 A | 6/1979 | Rose, II | 320/2 |
| 4,242,017 A | 12/1980 | De Fazio | 408/111 |
| 4,881,581 A | 11/1989 | Hollerback | 141/113 |
| 4,919,174 A | 4/1990 | Warland | 141/384 |
| 5,134,541 A | 7/1992 | Frouin | 361/334 |
| 5,272,431 A | 12/1993 | Nee | 320/2 |
| 5,306,999 A | 4/1994 | Hoffman | 320/2 |
| 5,327,066 A | 7/1994 | Smith | 320/2 |
| 5,344,330 A | 9/1994 | Hoffman | 439/138 |
| 5,352,122 A | 10/1994 | Speyer et al. | 439/13 |
| 5,498,163 A | 3/1996 | Takamura et al. | 439/13 |
| 5,562,467 A | 10/1996 | Davis, II et al. | 439/188 |
| 5,642,270 A | 6/1997 | Green et al. | 363/21 |
| 5,671,786 A | 9/1997 | Corfitsen | 141/94 |
| 5,703,461 A | 12/1997 | Minoshima et al. | 320/2 |

(List continued on next page.)

FOREIGN PATENT DOCUMENTS

| | | |
|---|---|---|
| DE | 42 13 159 A1 | 10/1993 |
| EP | 0 433 116 B1 | 9/1994 |
| GB | 2 352 886 A | 2/2001 |
| WO | WO 94/18723 | 8/1994 |
| WO | WO 98/12763 | 3/1998 |
| WO | WO 01/04984 | 1/2001 |
| WO | WO 01/28017 | 4/2001 |

*Primary Examiner*—J. Casimer Jacyna
(74) *Attorney, Agent, or Firm*—Dorsey & Whitney LLP

(57) ABSTRACT

This invention relates to a wheel stop service port for coupling to a connectivity device of a wheeled vehicle such that one or more services, namely electricity, data, and fluids, are transferable therebetween. The service port includes a housing having a receptacle recess with a recess opening on an outside surface of the housing; a fastener on the housing for fastening the service port to the ground; a receptacle inside the recess and comprising an opening shaped to receive a service plug of a vehicle connectivity device, and a service engagement portion inside the receptacle for engaging a corresponding service engagement portion on the plug; a service conduit junction coupled to the receptacle and couplable to a service conduit to enable the transfer of a service therebetween; and a wheel contact surface located on the housing outside surface such that upon contact of the contact surface by a wheel of a vehicle, the connectivity device of the vehicle is within coupling range of the service port.

47 Claims, 20 Drawing Sheets

U.S. PATENT DOCUMENTS

| | | | |
|---|---|---|---|
| 5,742,229 A | 4/1998 | Smith | 340/438 |
| 5,758,414 A | 6/1998 | Ehrenfels | 29/857 |
| 5,767,584 A | 6/1998 | Gore et al. | 290/1 R |
| 5,821,731 A | 10/1998 | Kuki et al. | 320/108 |
| 5,850,135 A | 12/1998 | Kuki et al. | 320/108 |
| 5,858,568 A | 1/1999 | Hsu et al. | 429/13 |
| 5,862,222 A | 1/1999 | Gunnarsson | 380/24 |
| 6,107,691 A | 8/2000 | Gore et al. | 290/1 R |
| 6,116,298 A | 9/2000 | Haimovich et al. | 141/94 |
| 6,157,162 A | 12/2000 | Hayashi et al. | 320/104 |
| 6,200,157 B1 | 3/2001 | Ams et al. | 439/409 |
| 6,202,710 B1 | 3/2001 | Dill et al. | 141/94 |
| 6,202,712 B1 * | 3/2001 | Aguilar | 141/98 |
| 6,347,785 B1 | 2/2002 | Copp et al. | 251/149.6 |
| 6,439,275 B1 | 8/2002 | Alhomsi | 141/94 |

* cited by examiner

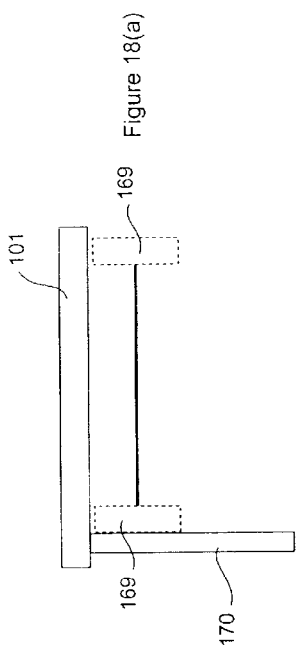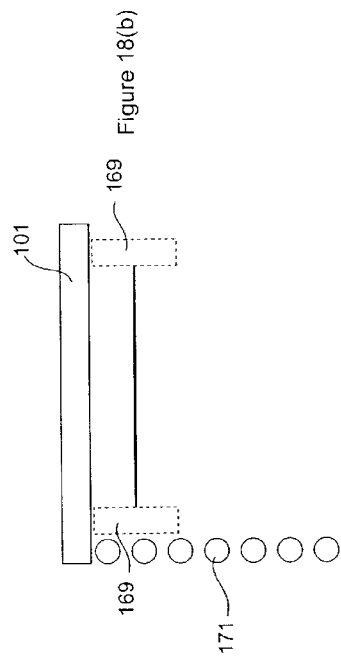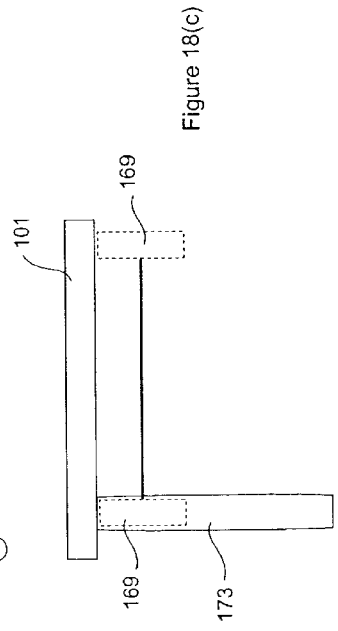

WHEEL STOP SERVICE PORT

RELATED APPLICATIONS

This application claims priority from and incorporates by reference U.S. provisional application No. 60/290,587 filed on May 11, 2001, and Ser. No. 60/347,585 filed on Jan. 10, 2002.

FIELD OF THE INVENTION

This invention relates generally to transfer systems, and more particularly to the transfer of a service such as electricity, fluids or data between a vehicle and a stationary service port.

BACKGROUND OF THE INVENTION

In today's world, motor vehicles such as automobiles, trucks, and motorcycles are typically powered by internal combustion engines. In these vehicles, a liquid fossil fuel such as gasoline is ignited to transform the chemical energy in the fuel into mechanical energy that is used to drive the vehicle. Due to the scarcity of fossil fuels and the pollution from vehicles burning these fuels, alternative fuels and new vehicles powered by these alternative fuels are being developed. For example, new types of vehicles that utilize gaseous fuels are being developed and are expected to enter commercial production within the next decade.

One type of gaseous fuel powered vehicle is a fuel cell vehicle (FCV), which uses a fuel cell to electrochemically generate electricity from hydrogen fuel and uses the electricity to power the vehicle. FCVs may use pure hydrogen delivered directly from a hydrogen fueling station, or may extract hydrogen from a hydrogen-containing fuel. In the latter case, a service terminal may for example, transmit a hydrogen-containing liquid such as methanol to the FCV, for reforming into hydrogen by an on-board methanol reformer. As another example, the FCV may have an on-board electrolyzer that uses electrolysis to extract hydrogen from water molecules supplied to the vehicle by the service terminal.

Because the FCV has different servicing requirements than gasoline-powered vehicles and because no FCV has yet to enter full-scale commercial production, no FCV servicing system is known to exist. Such an FCV servicing system would require service terminals that are configured to service FCVs; for example, an FCV service terminal may have a service port that connects to an FCV and facilitates the exchange of fuel, electricity and possibly data between the FCV and the service port. Providing such an FCV service terminal presents many challenges, including providing cost-effective and efficient systems for connecting the FCV to the service port.

SUMMARY OF THE INVENTION

According to one aspect of the invention, there is provided a service port for coupling to a connectivity device of a wheeled vehicle such that one or more services, namely electricity, data, and fluids, are transferable therebetween. The service port includes:

(a) a receptacle including an opening shaped to receive a service plug of a vehicle connectivity device, and a service engagement portion inside the receptacle for engaging a corresponding service engagement portion of the service plug;

(b) a service conduit junction coupled to the receptacle and couplable to a service conduit to enable the transfer of a service therebetween; and (c) a wheel contact surface located relative to the receptacle such that when a wheel of a vehicle contacts the contact surface, the connectivity device of the vehicle is within coupling range of the service port.

The service port may further include a housing with a recess in which the receptacle is located. The recess has a recess opening on an outside surface of the housing. A connection bay may be located in the recess between the recess opening and the receptacle; the connection bay may have tapered walls tapering from the recess opening to the receptacle opening. The receptacle and the connection bay may be made of materials that include an electrically insulating material.

A connection bay door may be provided that is movably mounted to the connection bay. A cleaning apparatus may be provided that is mounted to the connection bay such that the cleaning apparatus contacts the plug passing through the connection bay; the contact serves to remove unwanted material from the plug.

The wheel contact surface may be a portion of the outside surface of the housing. The service port may further include fasteners on the housing for fastening the service port to a parking surface. The housing may have a front, back and top surface, and the recess opening may be located on any one of these surfaces.

The housing may have a width selected to correspond to the wheel track of the vehicle and a height that enables the front overhang of the vehicle to clear the housing such that the front wheels of the vehicle can contact the wheel contact surface.

The service port may further include a lateral vehicle guide mountable to the parking surface relative to the housing such that contact between a wheel of the vehicle and the vehicle guide guides the vehicle to a suitable lateral position on the wheel stop contact surface. The lateral vehicle guide may be a raised rail, a plurality of spaced bumps, or an elongated groove.

The service port may further include a housing deployment motor assembly connected to the housing to move the housing between an operative position and an inoperative position. The housing may be pivotably mounted to the motor assembly such that the motor assembly pivots the housing between an operative position and an inoperative position. Or, the housing may be vertically slidably mounted to the motor assembly such that the motor assembly raises the housing into an operative position and retracts the housing into an inoperative position.

The service conduits may include fluid conduits, and the service port may further include a heating fluid transfer circuit or an electrical heat tracing thermally coupled to the fluid conduits.

The service port may further include a service port status indicator electrically coupled to the service conduit junction.

The service conduit may include an electrical conduit for transferring electricity between the service port and an electricity grid and the service port may further include a power filter electrically couplable to the service conduit. The service port may further include a bi-directional electricity meter electrically couplable to the electrical conduit to measure the electricity transmitted by the electrical conduit.

An electronic service port controller may be located inside the housing, and be electrically communicative with the receptacle.

DETAILED DESCRIPTION OF DRAWINGS

FIGS. 15(a) to 15(c) are schematic side views of different methods of coupling the connectivity device to the wheel stop service port.

Figure 16:
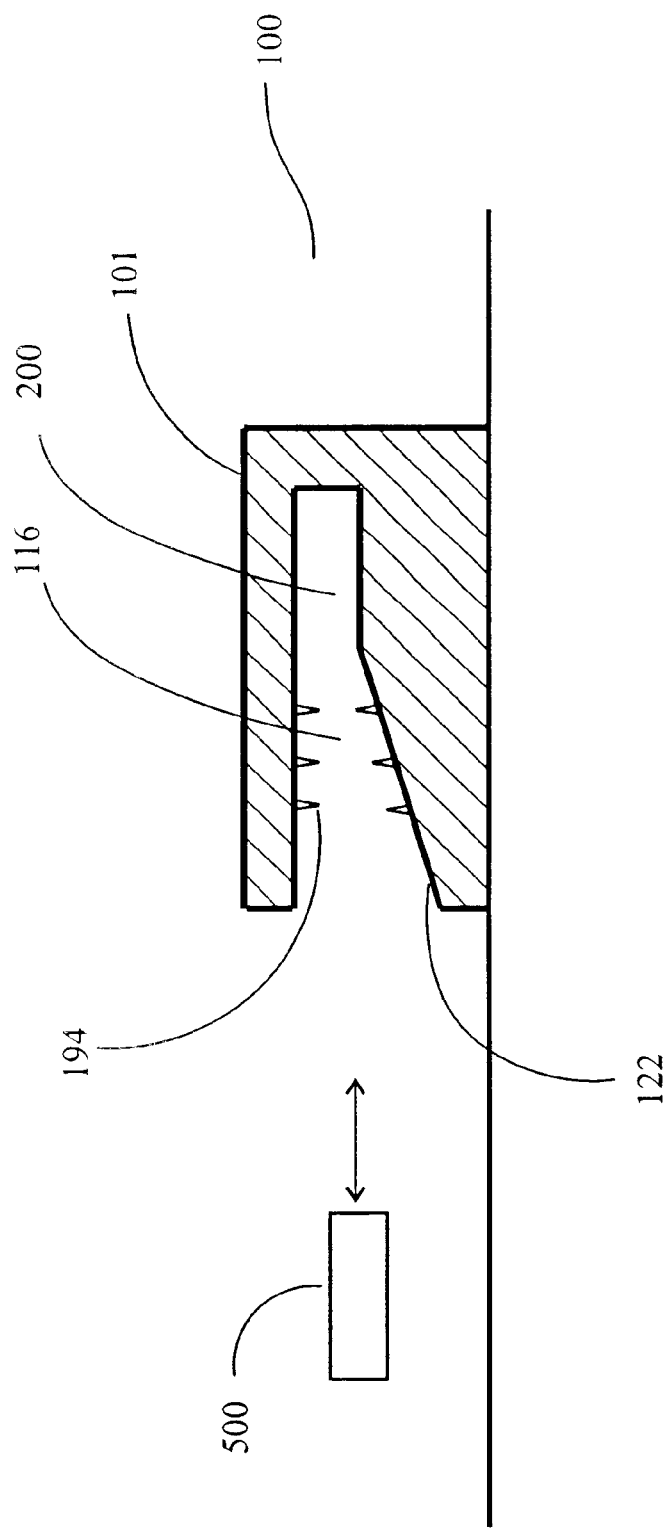

FIG. 16 is a schematic sectional side elevation view of the wheel stop service port having cleaning brushes.

Figure 17:
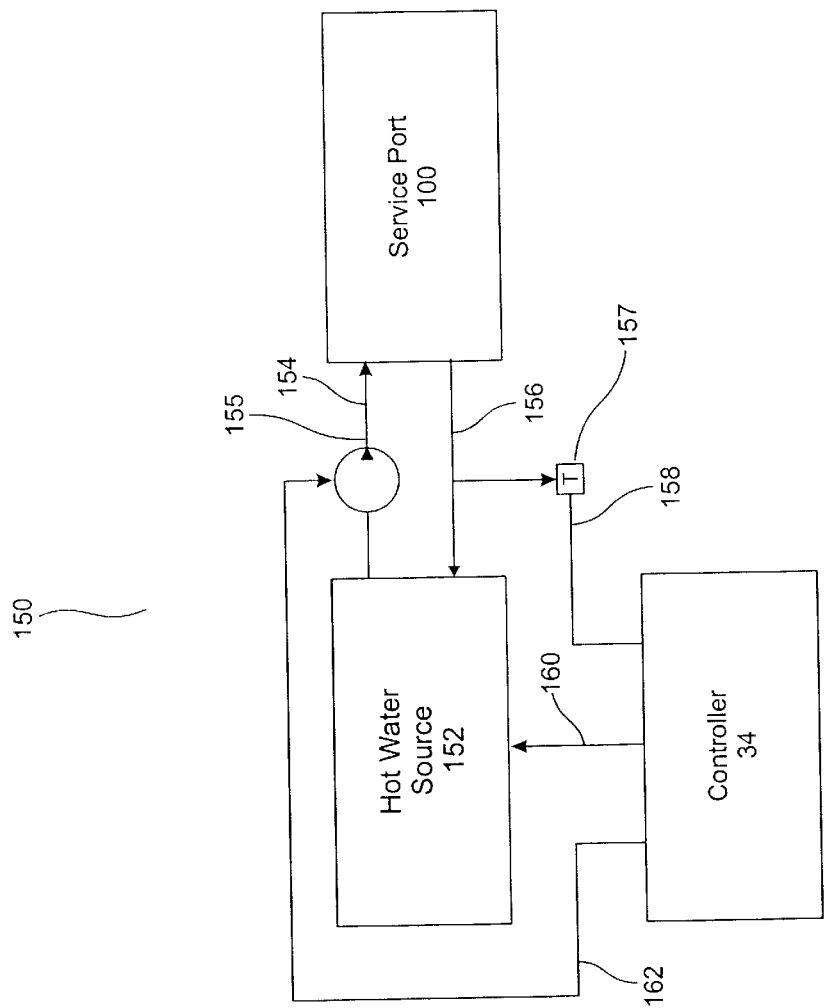

FIG. 17 is a schematic block diagram of a wheel stop heating fluid transfer circuit.

FIGS. 18(a) to 18(c) are a schematic sectional side view and schematic plan views of vehicle docking guides of the service port.

Figure 19A:
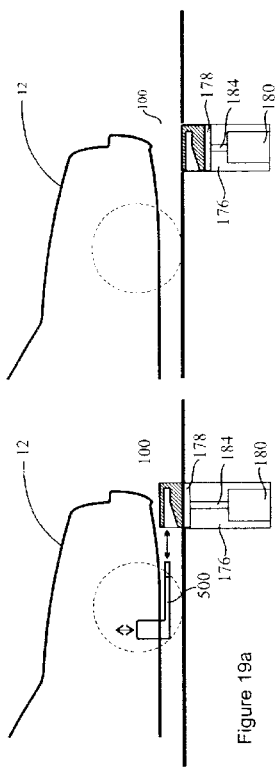
Figure 19B:
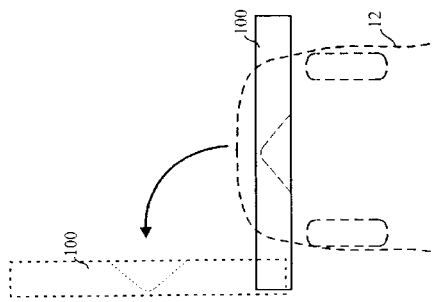
Figure 19C:
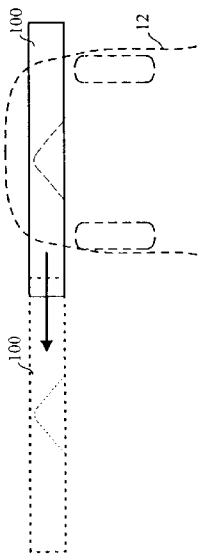

FIGS. 19(a) to 19(c) are schematic side elevation and plan views of service port deployment apparatus for moving the service port between an operative and inoperative position.

Figure 20:
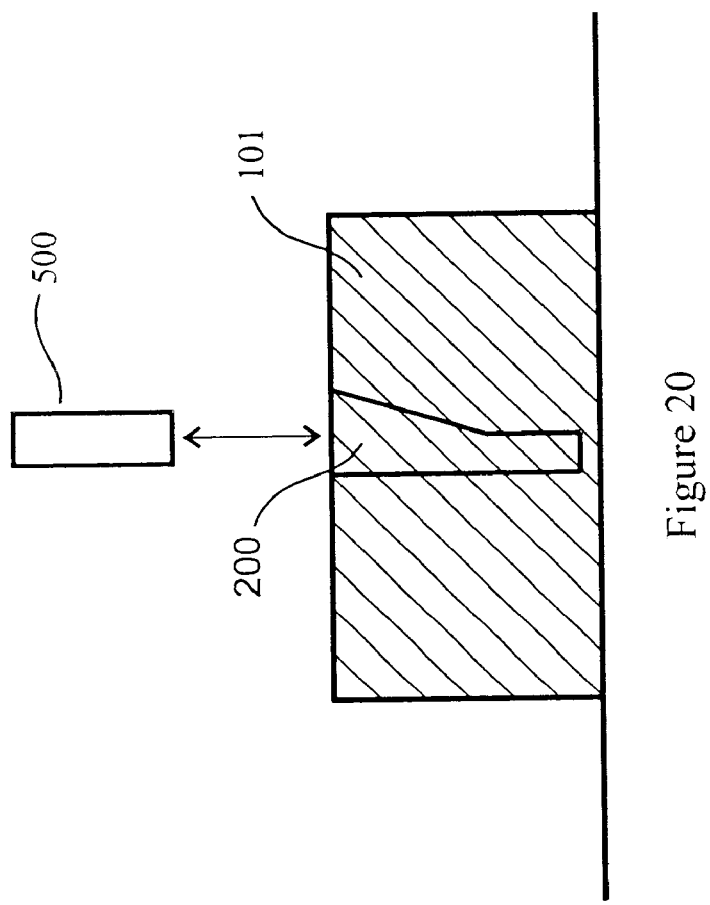

FIG. 20 is a schematic side view of a service port having a recess opening on the top surface of the service port housing.

Figure 21:
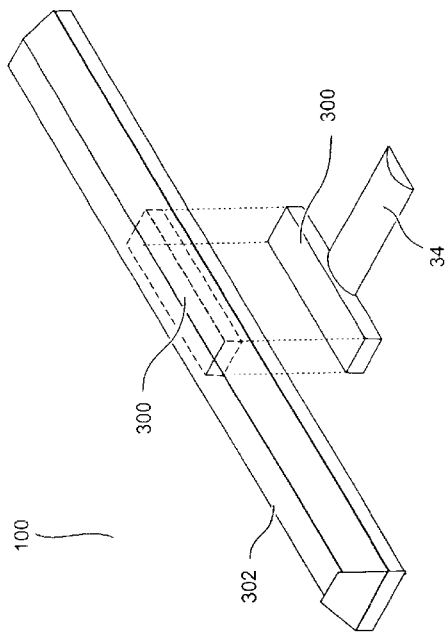
Figure 21:
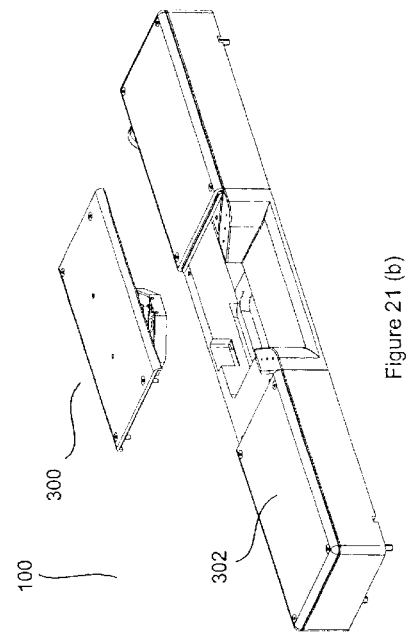

FIGS. 21(a) and 21(b) are a schematic perspective view of a modular service port having a replaceable housing module mounted to a receptacle module.

DETAILED DESCRIPTION

FIGS. 1–5 illustrate different embodiments of a system 10 for transferring one or more of energy, material or data (collectivity referred to as "services") between system-compatible vehicles 12 and a stationary service terminal 14. The service terminal 14 may be integrated into a building or pre-existing structure, or be part of a dedicated vehicle service terminal building; or, the service terminal may be made mobile by, for example, integrating into a refueling vehicle. In each embodiment, the service terminal 14 has a wheel stop service port 100 and the vehicle 12 has a connectivity device 500 that can couple to the wheel stop service port 100. Other major components of the service terminal 14 include a service port controller 34 for controlling the transfer of services by the wheel stop service port 100, and a port service conduit 36 for coupling the service terminal 14 to one or more service destinations (not shown). The destination may be a service source when the service is to be transferred from the source to the vehicle 12; for example, the service source may be a fuel tank that supplies fuel to the vehicle 12 when coupled to the service terminal 14. Or, the destination may be a service consumer when the service is to be transferred from the vehicle 12 to the consumer; for example, the service terminal 14 may be connected to a power grid, and the consumer may be an electricity user connected to the grid that receives electricity generated by a fuel cell onboard the vehicle 12 and transferred to the grid when the vehicle 12 is connected to the service terminal 14.

The system 10 is particularly suitable for providing services to fuel cell and regenerative fuel cell vehicles, but can also serve vehicles powered by other means, such as natural gas, electricity, etc. The vehicle 12 has a number of components that make it compatible with the service terminal; the type of components depend on what services are being transferred.

Figure 1:
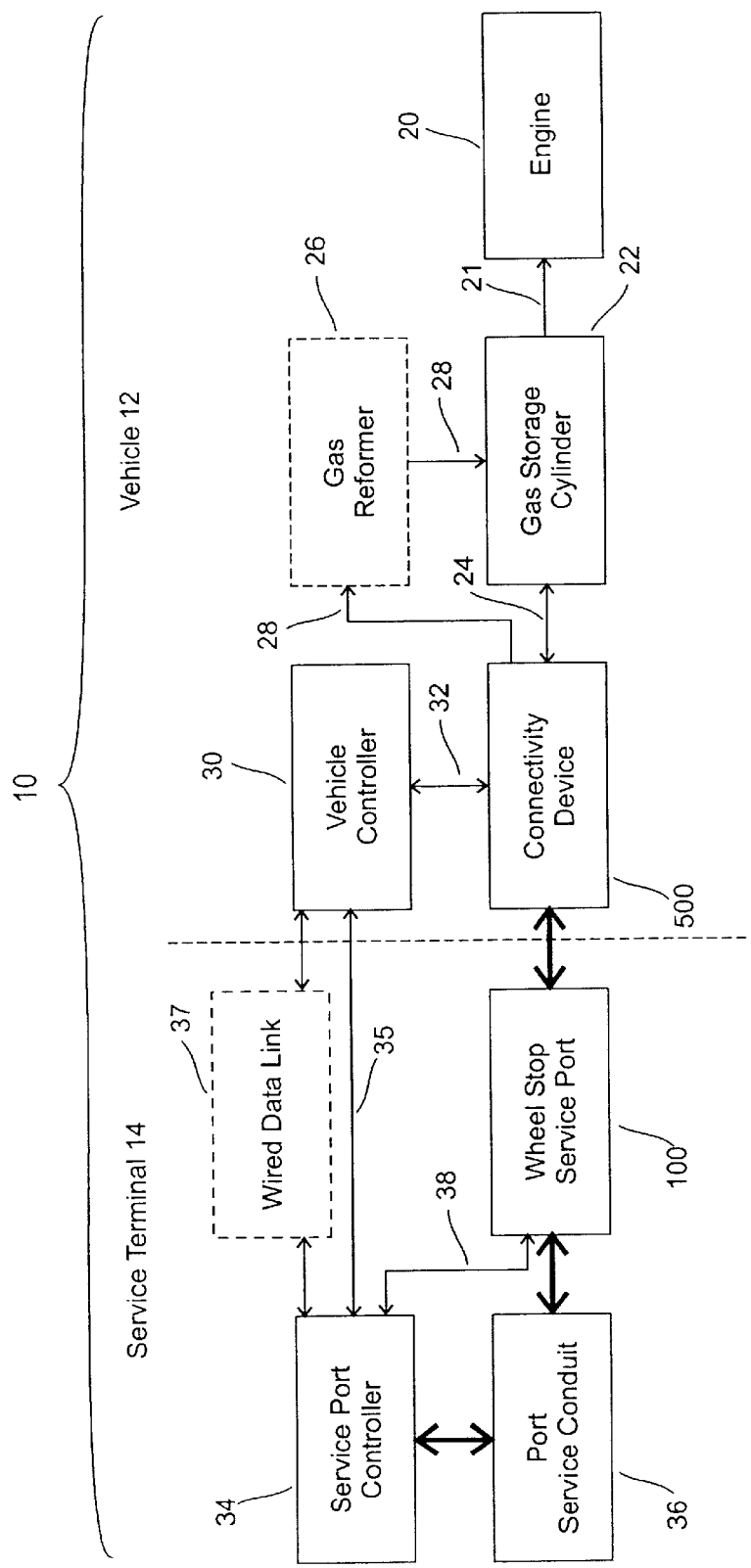
FIG. 1 is a system block diagram of a service terminal and a terminal-compatible vehicle, wherein a gaseous fuel and data are exchangeable between the terminal and vehicle.

FIG. 1 illustrates a system 10 that transfers gaseous fuel between the vehicle 12 and the service terminal 14. The gaseous fuel may be hydrogen. The vehicle 12 is suitably any known vehicle that can operate on gaseous fuels, such as fuel cell vehicles (FCV), regenerative fuel cell vehicles (RFCV), and internal combustion engine vehicles (ICEV). The vehicle 12 includes a gaseous fuel compatible engine 20, and a gas storage cylinder 22 fluidly connected to the engine 20 and the connectivity device 500 by a gas line 24. The connectivity device 500 has a fluid exchange interface (not shown) that is sealably connectable to a fluid exchange interface (not shown) of the wheel stop service port 100 to enable the transfer of gas between the vehicle 12 and the service terminal 14. Optionally, a gas reformer 26 is provided that is connected to the connectivity device 500 and the gas storage cylinder 22 via another gas line 28, so that gaseous fuel transmitted from the wheel stop service port 100 can be first reformed before being stored in the gas storage cylinder 22 and used by the engine 20. Gas lines 24 and 28 are bi-directional to enable fuel to be transmitted from the service terminal 14 to the vehicle 12, or vice versa.

The connectivity device 500 is electrically communicative with a vehicle controller 30 via control signal wire 32, which controls operation of the connectivity device 500; for example, the vehicle controller 30 provides automatic connection and gas transfer control signals to control the transfer of gaseous fuel through the connectivity device 500. The vehicle controller 30 has a transceiver (not shown) to exchange data wirelessly with a transceiver (not shown) in a service port controller 34 of the service terminal 14 (wireless link shown as 35). The construction of the controllers 30, 34 are known in the art. Optionally, a wired data link 37 may be substituted for the transceivers; in such case, data line connection points (not shown) are provided on each of the wheel stop service port 100 and the connectivity device 500, that connect when the wheel stop service port 100 and the connectivity device 500 are coupled or alternatively data can be sent over the electrical power connections. The data communicated to and from the vehicle controller 30 relates to providing data-related services that include vehicle identification, initiating connection, and fueling processes.

The port service conduit 36 is fluidly connected to the wheel stop service port 100 and an off-vehicle fuel source/destination, and is electrically connected to the wheel stop service port 100 and the service port controller 34 and an off-vehicle electricity source/destination. Optionally, a control signal wire 38 may be provided to link the service port controller 34 directly to the wheel stop service port 100 and enable direct communication between the two components. The port service conduit 36 may be fluidly connected to storage tanks (not shown) of the service terminal 14 that may be supplied fuel from time to time by refueling tankers (not shown), or to a fluid pipeline (not shown) in a gas distribution network (not shown) for the continuous supply of fuel.

Figure 2:
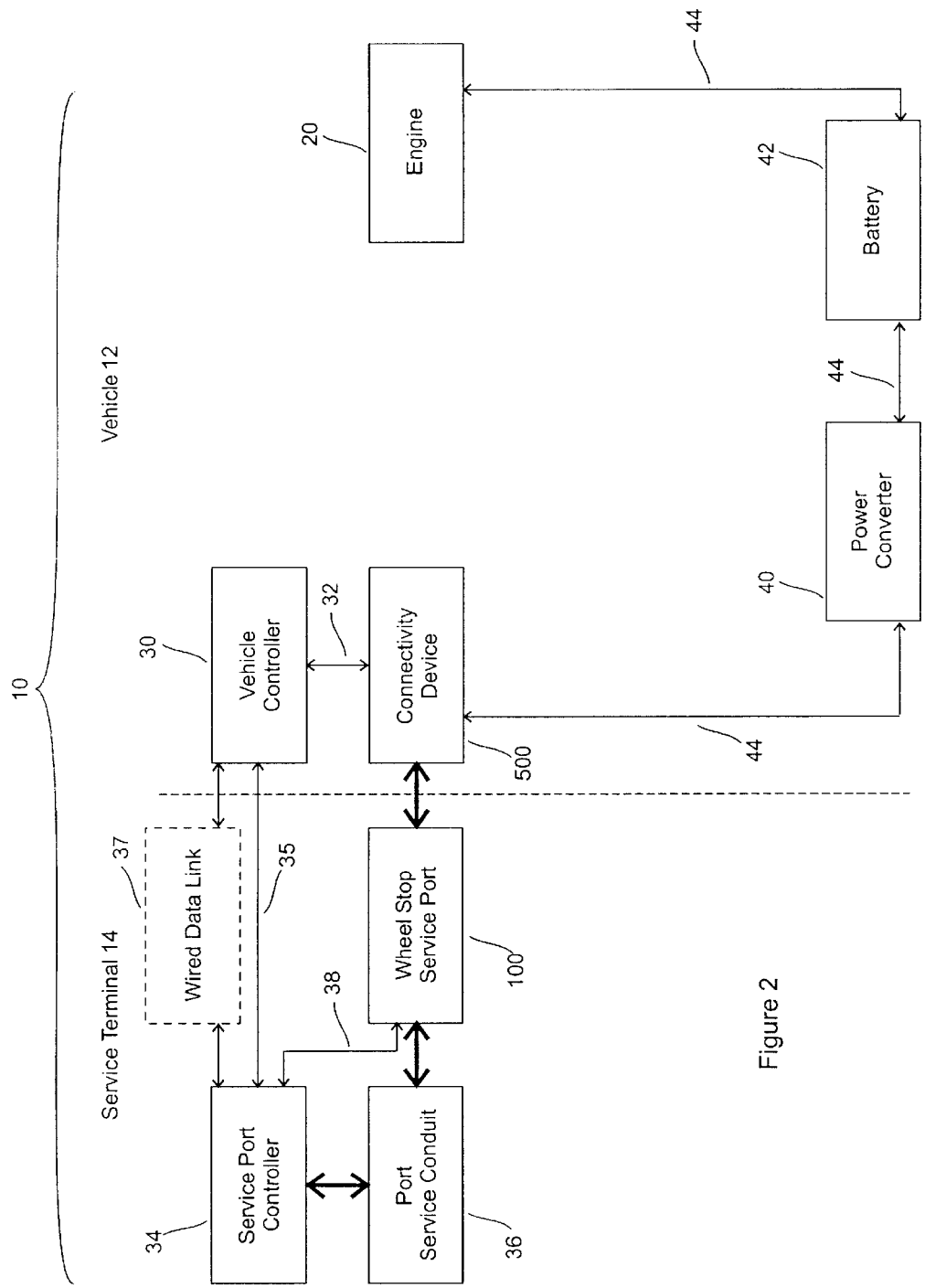
FIG. 2 is a system block diagram of a service terminal and a terminal-compatible vehicle, wherein electricity and data are exchangeable between the terminal and vehicle.

FIG. 2 illustrates a system 10 that transfers electrical energy between the vehicle 12 and the service terminal 14, wherein the vehicle 12 is a battery-powered electric vehicle (BPEV). The vehicle 12 therefore differs from the vehicle shown in FIG. 1 in that a power converter 40, battery 42 and electrical cables 44 replace the gas storage cylinder 22 and gas lines 24. Furthermore, the engine 20 is an electric motor, and the connectivity device 500 is configured to transmit electric power between the service terminal 14 and the vehicle 12, and the vehicle controller 30 is configured to control the transmission of electrical energy by the connectivity device 500. Electrical cables 44 electrically couple the connectivity device 500, power converter 40, battery 42, and the engine 20. Similarly, the wheel stop service port 100 is configured to transmit electric power between the service terminal 14 and the vehicle 12, and the service port controller 34 is configured to control the transmission of energy by the wheel stop service port 100.

Figure 3:
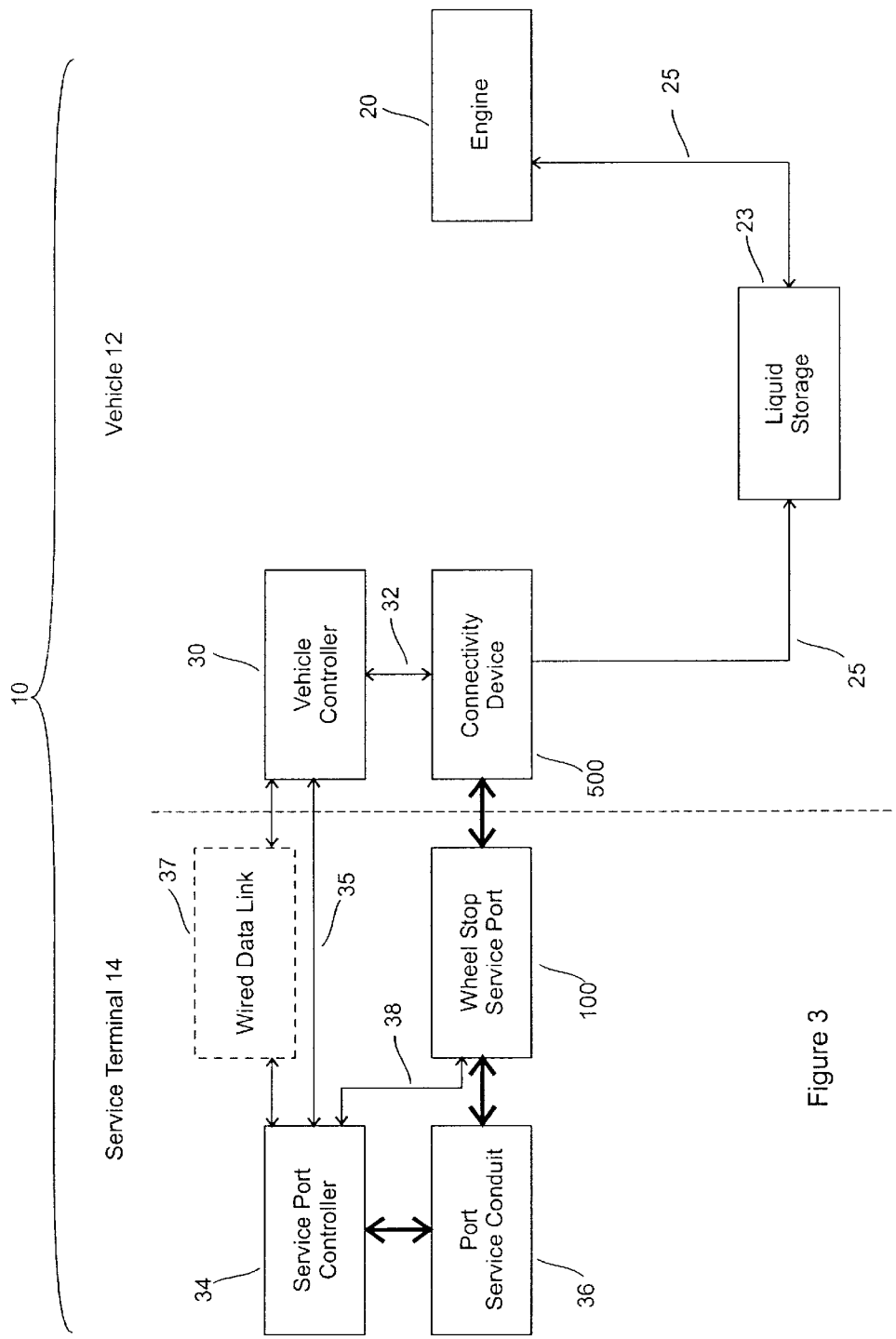
FIG. 3 is a system block diagram of a service terminal and a terminal-compatible vehicle, wherein liquid fuel and data are exchangeable between the terminal and vehicle.

FIG. 3 illustrates a system 10 that transfers liquid fuel between the service terminal 14 and the vehicle 12. The liquid fuel may be fuel that is directly combustible by a conventional internal combustion engine, or be reformed into hydrogen reformate for use by a fuel cell. The vehicle 12 therefore differs from the vehicle shown in FIG. 1 in that a liquid fuel storage tank 23 and liquid fuel lines 25 are designed to store and transmit liquid fuel as known in the art. Furthermore, the engine 20 is an internal combustion engine if the fuel is to be directly combusted, or a fuel cell if the fuel is reformate (in such case, a reformer (not shown) is provided to reform the fuel into hydrogen reformate and reaction products, and a scrubber is provided (not shown) to clean the fuel sufficiently for use by the fuel cell) and the connectivity device 500 is configured to transfer liquid fuel between the service terminal 14 and the vehicle 12, and the vehicle controller 30 is configured to control the transmission of liquid by the connectivity device 500. Similarly, the wheel stop service port 100 is configured to transmit liquid fuel between the service terminal 14 and the vehicle 12, and the service port controller 34 is configured to control the transmission of liquid fuel by the wheel stop service port 100.

Figure 4:
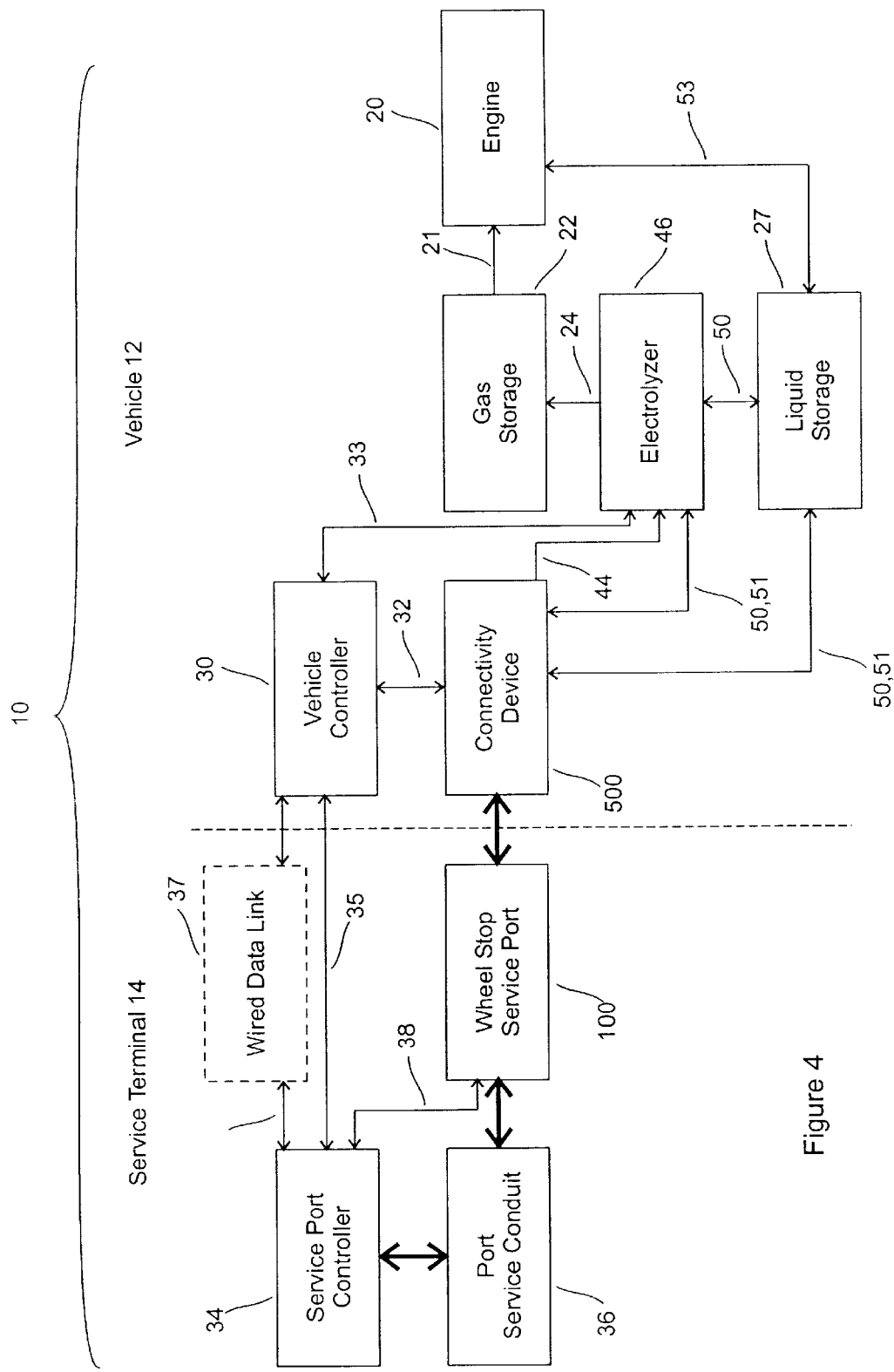
FIG. 4 is a system block diagram of a service terminal and a terminal-compatible vehicle, wherein water, electricity and data are exchangeable between the terminal and vehicle.

FIG. 4 illustrates a system 10 that transfers water and electrical energy between the service terminal 14 and the vehicle 12. The water is electrolyzed on-board the vehicle 12 to generate hydrogen fuel. The vehicle 12 therefore differs from the vehicle shown in FIG. 1 in that a liquid storage tank 27 is provided to store water transferred from the service terminal 14, an electrolyzer 46 is provided to electrolyze the water to produce hydrogen gas, and a gas storage cylinder 22 is provided to store the hydrogen gas for use by the engine 20. Hydrogen fuel lines 21 fluidly connect the gas storage cylinder 22 to the electrolyzer 46 and engine 20 respectively, and fluid supply and return lines 50, 51 fluidly connect the fluid storage tank 27 to the connectivity device 500 and the electrolyzer 46 respectively. Water is supplied to the vehicle 12 as hydrogen feedstock for the electrolyzer 46 via liquid supply line 50, and unused water from the electrolyzer 46 is returned through liquid return line 51. Water line 53 connects the liquid storage tank 27 to the engine 20 to return product water from the engine 20 and to supply water to humidify the gas stream. Both the connectivity device 500 and the wheel stop service port 100 are configured to transfer liquid and electricity between the service terminal 14 and the vehicle 12. Electrical cables 44 electrically connect the connectivity device 500 to the electrolyzer 46. The vehicle controller 30 is configured to control the operation of the connectivity device 500 to transfer water and electricity for the operation of the electrolyzer 46. The vehicle controller 30 is electrically communicative with the connectivity device 500 via control signal wire 32 and with the electrolyzer 46 via electrical connector 33. The service port controller 34 is configured to control the operation of the wheel stop service port 100 to transfer water and electricity. The service port controller 34 is electrically communicative with the wheel stop service port 100 via the port service conduit 36. Optionally, the controller 34 may include control signal wires 38 connected directly to the wheel stop service port 100 to provide liquid and electricity transfer control signals to control the transfer of liquids and electricity through the wheel stop service port 100.

In operation, water is transferred to the vehicle 12 through the wheel stop service port 100 and through the coupled connectivity device 500 and then stored in the liquid storage tank 27. The water is then transferred to the electrolyzer 46 and transformed to gaseous hydrogen by-product which is transferred to gas storage cylinders 22 through gas line 24. Electricity is transferred through the wheel stop service port 100 and the connectivity device 500 and to the electrolyzer 46 to power the electrolysis process. Alternatively, water is transferred to the vehicle 12 through the wheel stop service port 100 and through the coupled connectivity device 500 directly to the electrolyzer 46.

Figure 5:
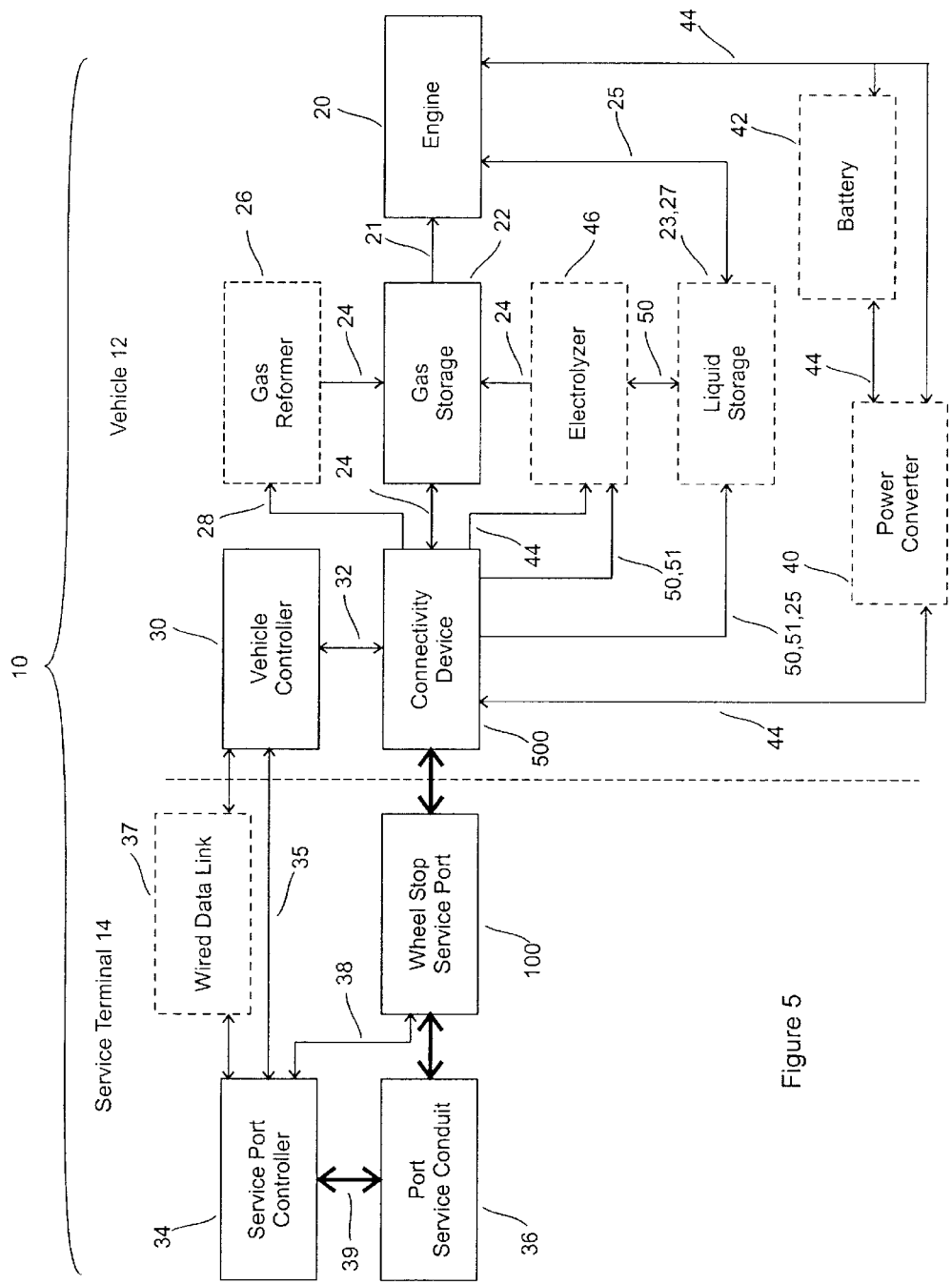
FIG. 5 is a system block diagram of a service terminal and a terminal-compatible vehicle, wherein liquid and gaseous fuels, water, electricity and data are exchangeable between the terminal and vehicle.

FIG. 5 illustrates a system 10 that is capable of transferring one or more of gaseous and liquid fuel, electrical energy and data between the service terminal 14 and the vehicle 12. The vehicle 12 may include some or all of the components as described in the systems illustrated in FIGS. 1 to 4. The connectivity device 500 may include one or a combination of the service connections as described in the previous systems. For this embodiment, the wheel stop service port 100 has interfaces for at least gaseous fuel, liquid, electricity and data. The wheel stop service port 100 is suitable to work with the connectivity device 500 of any of the vehicles described in FIGS. 1 to 4, regardless of the maximum number of service connections on the connectivity device 500. An additional function of the system 10 is that the type of connectivity device 500 and the type of service required is determined by communication between the vehicle controller 30 and the service port controller 34. The service port controller 34 provides control signals through the control signal wire 38 to the wheel stop service port 100 directly, or via control signal wire 39 and port service conduit 36 to control the transfer of only those services suitable for the identified connectivity device 500.

Additional features may be incorporated into any of the service terminals 16 that utilize water flow, such as an integrated pressure relief valve (not shown) and/or flow limiting device (not shown) connected in-line to the fluid lines 50 for the purpose of restricting fluid flow. These components reduce the risk and scale of problems caused by fluid delivery component (not shown) failures by restricting or redirecting fluid flow, as would be understood by one skilled in the art.

Water quality control features may be incorporated into any of the service terminals 16 that utilize water flow, such as an integrated filter (not shown) connected to the fluid lines 50 for the purpose of treatment to remove contaminants (particulates, etc.) and/or to de-ionize the water. The treatment of the delivered water maintains the cleanliness of the connectivity device 500 and enhances the operation of the electrolyzer 46 and fuel cells.

An optional method of connecting the fluid line 50 from the wheel stop service port 100 to the connectivity device 500 of the system 10 of FIGS. 4 and 5 is to include a self-sealing permeable or semi-permeable membrane (not shown) in the water flow path for water transfer. The advantage of this feature is to provide self-sealing and water filtering when the connection is made.

Referring now to FIGS. 7 to 10, the wheel stop service port 100 serves as a ground-mounted stationary docking port for vehicles equipped with compatible connectivity devices. Such vehicles couple to the wheel stop service port 100 and bi-directionally transfer services between the service terminal 14 and the vehicle 12. As mentioned, these services include electrical power, gaseous or liquid fuels, water, or data. The wheel stop service port 100 is also designed to prevent the wheels of the vehicle 12 from traveling beyond a specific point in a parking stall, and to locate the vehicle 12 in a position that places the vehicle's connectivity device 500 in range for coupling to the service port 100.

According to one embodiment of the invention, the wheel stop service port 100 has a wheel stop housing 101 that includes a generally elongate rectangular housing body 102 and top cover panels 104. The top cover panels 104 are fastenable to the top of the housing body 102 by panel screws 106. Near the center of the front surface of the housing body 102 is a recess opening 108 to a receptacle and receptacle recess 109. Inside the housing body 102 are cavities 110 to hold various components of the service port 100. At the corners of the housing body 102, there are provided generally vertical fastening holes 112 for cooperating with fastening bolts 114 to fasten the service port 100 to the ground. At the back of the housing 101 are service conduit junctions 115, 117, 119 for coupling the port service conduits 36 to the wheel stop service port 100; in particular, electrical conduit junction 115 and signal conduit junction 119 are provided at the right rear of the housing 101 for coupling to respective electrical power and signal conduits (not shown), and fluid conduit junction 117 is provided at the left rear of the housing 101 for coupling to respective fluid and hydrogen conduits (not shown).

The wheel stop housing 101 can be economically manufactured out of durable materials such as plastic or concrete to provide the benefits of economical, modular units. The housing 101 could be made in a wide range of shapes or colors either for cosmetic reasons or to indicate different types or sizes of services (for example, a different color to indicate a high-electrical-capacity port for larger vehicles with larger electrolyzers.)

It is to be understood that directional indicators such as "top", "front", "back" etc. are used in this specification as convenient reference terms indicative of the usual orientation of the wheel stop service port 100 in operation, but are not to be construed to limit the operational orientation of the service port 100 in any way. In particular, the front of the service port 100 is defined to be the portion facing the vehicle 12.

The shape of the panels 104 in this embodiment are planar and the housing 101 has height and a width that enables a vehicle 12 to drive up to the service port 100 and have its front overhang (portion of the vehicle in front of the wheels) clear the top of the service port 100, and its two front tires abut against the front surface of the service port 100; contact with the service port 100 indicates to the driver that the vehicle 12 is in position for coupling. In case the driver miscalculates the vehicle's position relative to the service port 100, the planar top panels 104 enable the vehicle 12 to be driven over the service port 100 without the vehicle 12 or service port 100 suffering damage. While this embodiment illustrates an elongate rectangular box shaped housing 101, it is within the scope of the invention to provide different shapes for the housing 101, so long as the shape serves as a wheel stop for the vehicle 12, and is able to house the service port's coupling devices. For example, the wheel stop service port 100 may comprise simply a pair of wheel contact surfaces 103 and a receptacle 200 for receiving a plug 500 from the vehicle 12, wherein the contact surfaces 103 are positioned relative to the receptacle 200 such that contact between the contact surfaces 103 and the vehicle 12 positions the vehicle 12 in place for service coupling. In such case, a pair of wheel contact surfaces 103 may be placed on either side of the receptacle 200 to correspond with the wheel track of the target vehicle(s) 12; or, a single wheel contact surface 103 may be used provided the contact with one of the front wheels of the vehicle locates the vehicle in a range for coupling.

Figure 14:
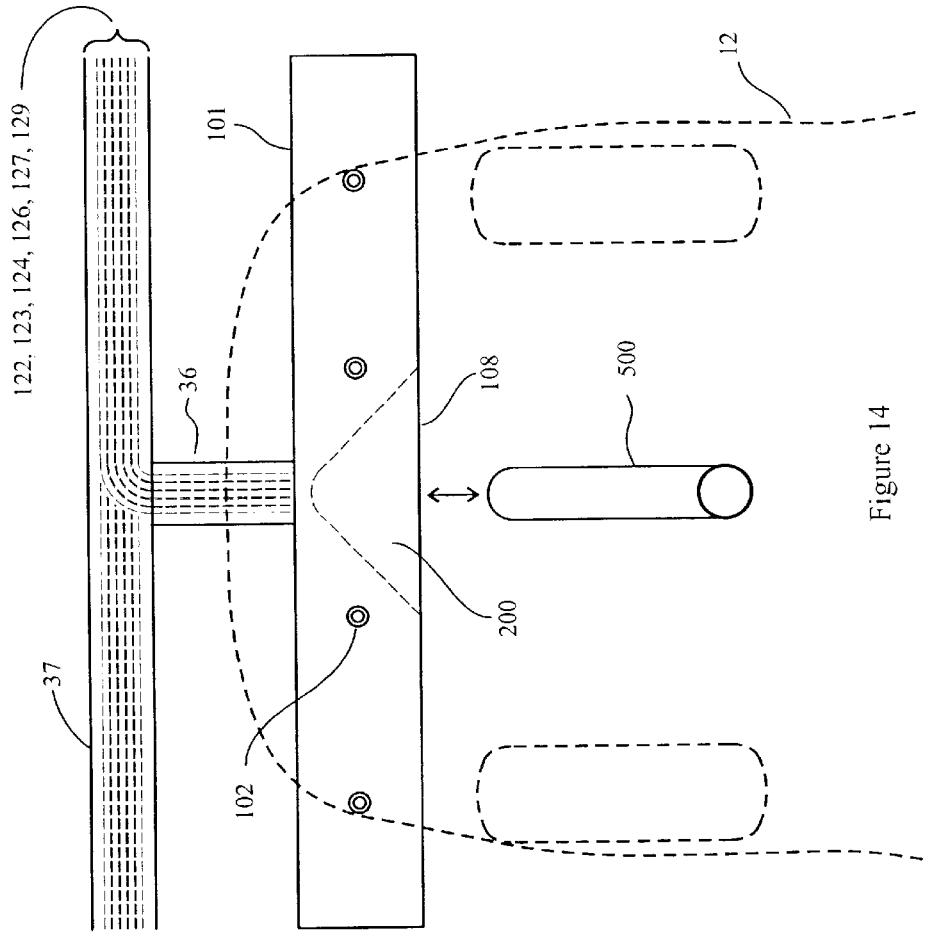
FIG. 14 is a schematic plan view of the wheel stop service port connected to a service conduit, and a vehicle having a connectivity device for coupling to the wheel stop service port.

The fastening holes 112 may be recessed and/or shouldered for easy flush mounting of the bolts within wheel stop housing 101. The wheel stop housing 101 is fixed in position suitably on a parking surface of a service terminal 14 at a location within a parking stall of the terminal 14, such as in the center of the parking stall. In a typical installation, the wheel stop service port 100 would be mounted to a parking surface either inside or outside a building. It would typically be located near the end of a parking stall furthest from a driving or access lane, such that a driver can enter the parking stall in the normal front-end first (or nose-in) direction and stop with the vehicle nose near, over or at the wheel stop. The service port 100 may be one of several service ports in a service terminal 14. FIG. 14 shows the service port 100 connected via port service conduit 36 to a multiple port service conduit 37 that is connected other service ports (not shown).

The port service conduits 36 include an AC power conduit connected to an AC power connector in the electrical conduit junction 115 and to the external power source/destination, a DC signal conduit connected to a signal connector in the electrical signal junction 119 and the service port controller 34, a fluid conduit connected to a fluid connector in the fluid conduit junction 117 and to the external fluid source/destination, and a hydrogen conduit connected to a hydrogen connector in the fluid conduit junction 117 and to the external hydrogen source/destination. The port service conduits 36 may be routed underground to avoid damage from the outside environment. Or, the port service conduits 36 may be housed in a single protective jacket and be embedded into the parking surface. Alternatively, the fluid conduits and electrical conduits may be housed in separate jackets.

A connection bay assembly comprising a connection bay 116 and a receptacle 200 is mounted in the receptacle recess 109 of the housing body 102. The connection bay 116 has a front opening in the shape of a rectangular slot, and has walls 122 that taper inwards both vertically and horizontally into the receptacle 200. The connection bay 116 is mounted in the recess 109 such that the front opening is flush with the recess opening 108. The receptacle 200 is mounted inside the housing 101 behind the connection bay 116 and also has tapered walls 226 that taper into the back wall of the receptacle 200. As will be discussed below, the tapered walls 122, 226 guide a service plug 502 from the vehicle's connectivity device 500 into a coupling position inside the receptacle 200, i.e. into a position where the plug 502 contacts the back wall of the receptacle 200.

The tapered walls 122, 226 act to guide, or "self locate" the plug 500 into a coupling position, thereby removing the need to provide costly electronic coupling guidance systems. It is understood that other self-locating designs such as a funnel may be substituted for the tapered walls 122, 226 as will occur to one skilled in the art.

Safe operation of the wheel stop service port 100 includes insulating any electrical components inside the housing 101 from potential shorts or sparks from conductive surfaces. An example of the housing material (not shown) could be a molded insulating plastic, suitably rigid and insulating for protecting these internal components from damage. In an example where the wheel stop housing 101 material is conductive, such as stamped metal, the sections of the housing 101 in proximity to the connection bay 116 require insulation, as commonly understood in the industry. This insulation can include an insert-molded housing (not shown) of an electrically insulating material that covers the wheel stop conductive housing 101 (e.g. plastic), or portions of the wheel stop conductive housing 101. An additional design includes adding features, such as rounded surface crenellations standard in the industry, inside the connection bay 116, to increase "creepage distances" to keep moisture and/or dirt from bridging insulation and causing electrical flash-over.

An externally controlled receptacle 200 allows system intelligence such as the service port controller 34 to be located elsewhere and coupled to the wheel stop service port 100 through the port service conduit 36, meaning that the wheel stop service port 100 is a "dumb terminal" that can be economically and easily replaced. Optionally a port status indicator 105 is mounted in an optional port status indicator mount (not shown) and electrically coupled to the receptacle 200. Status control signals can be sent from the service port controller 34 through the receptacle 200 to the port status indicator, and may include a port failure status control signal. Or, the indicator 105 may be directly coupled to the controller 34 to receive status control signals.

One embodiment to provide a "smart" wheel stop service port 100 can add a wheel stop controller (not shown) within the receptacle 200 to control the functions of the port or assist the vehicle, the service network or any other system or component to control the functions of the wheel stop service port 100. The wheel stop controller is connected to the conduit connections and connection port 116 and could perform any subset of the service port controller functions except for power breaking.

Figure 6:
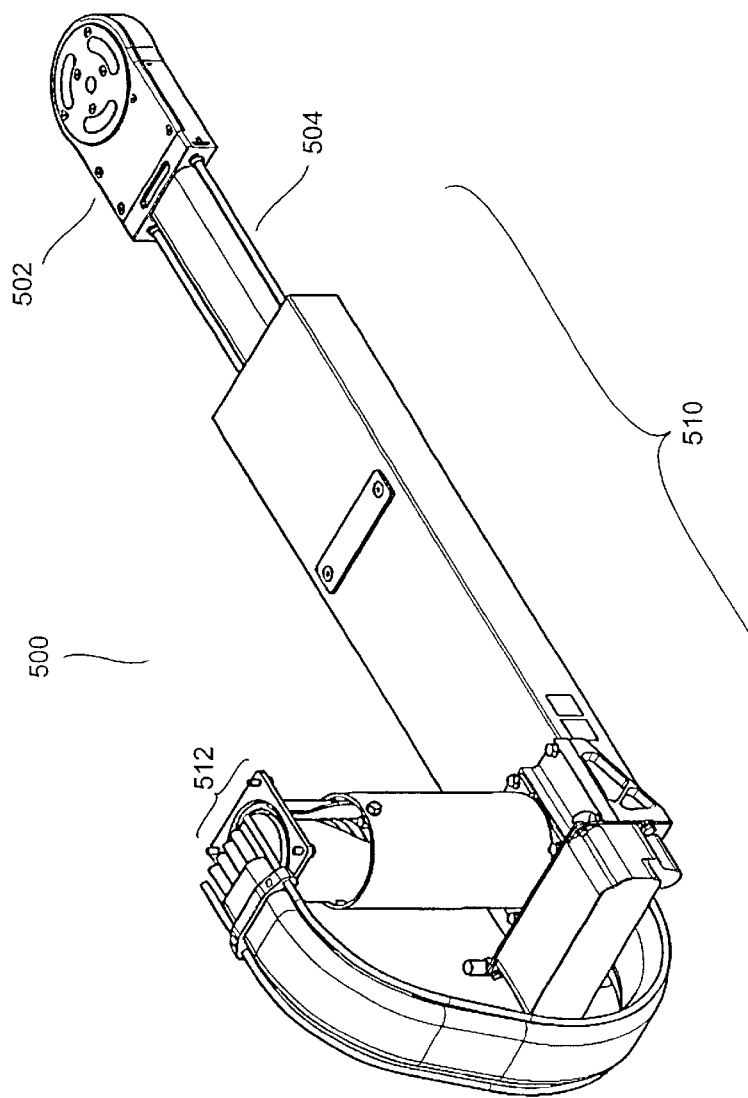
FIG. 6 is a perspective view of a connectivity device.
Figure 7:
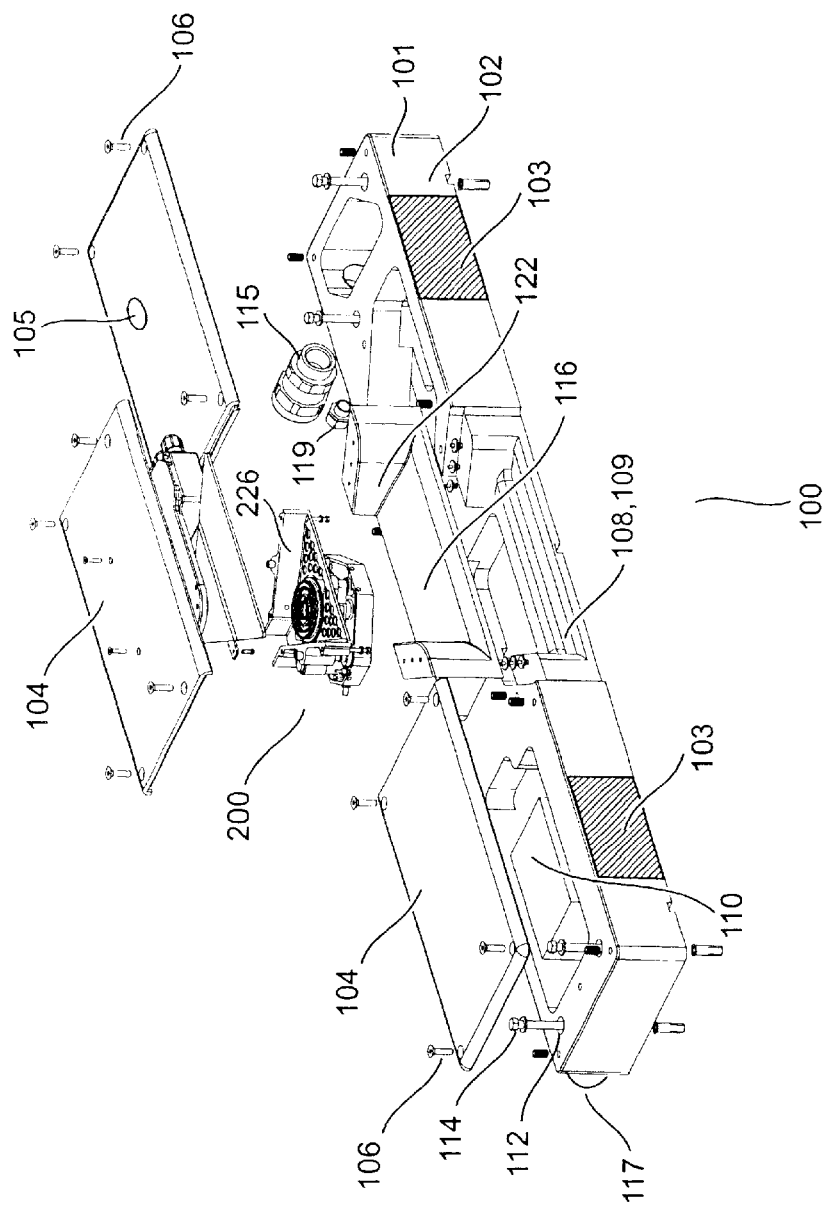
FIG. 7 is an exploded perspective view of a wheel stop service port of the service terminal in FIGS. 1 to 5.
Figures 8, 9:
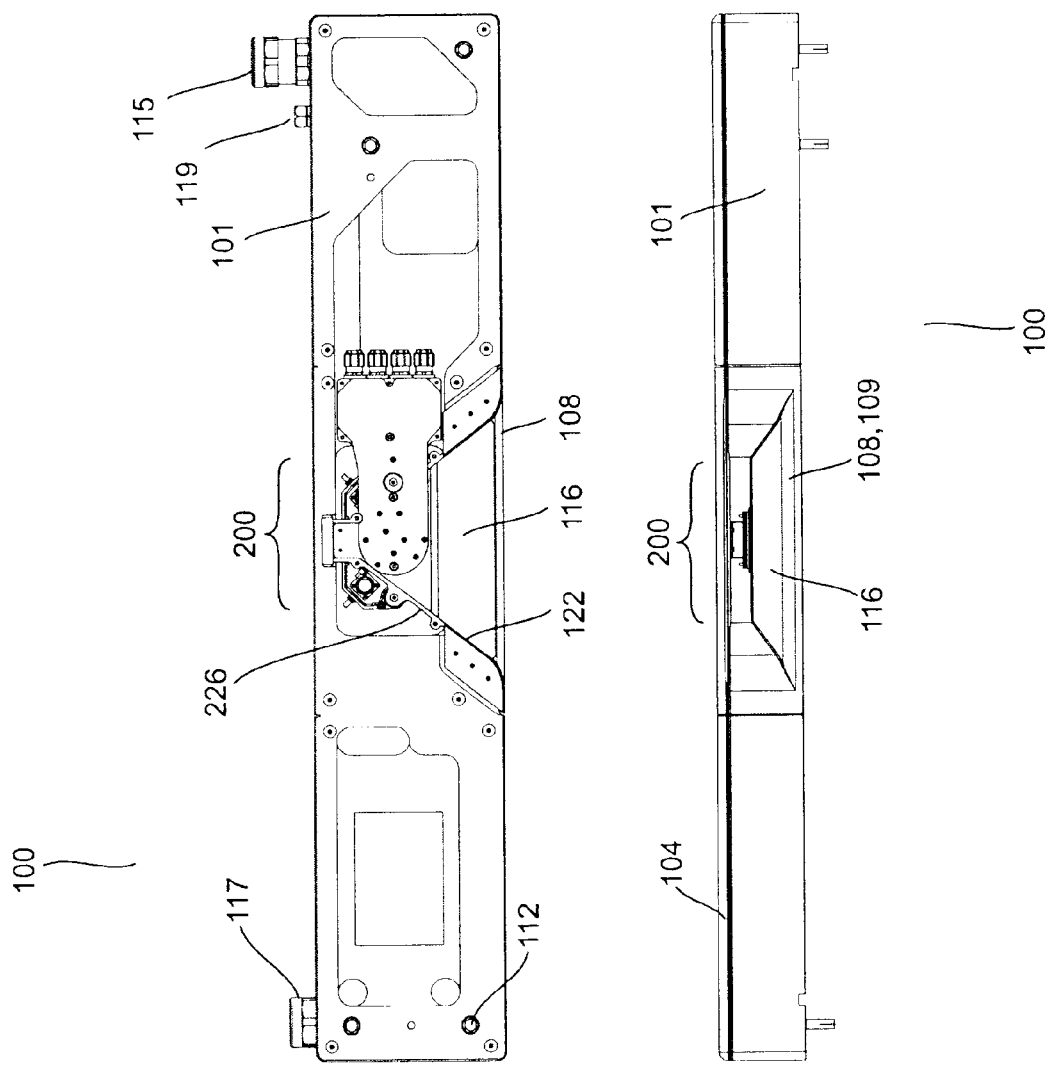
FIG. 8 is a top plan view of the wheel stop service port, with the top panels removed to show interior components of the service port.
FIG. 9 is a front elevation view of the wheel stop service port.

Referring to FIG. 6, a connectivity device 500 is provided for connecting the vehicle 12 to the service terminal 14 such that services can be exchanged therebetween. In this first embodiment, the connectivity device 500 is mountable to the front underside of the vehicle 12, has a motorized mechanism to deploy the connectivity device 500 from the vehicle 12, and has a plug 502 to couple to the receptacle 200 on the wheel stop service port 100 when the vehicle 12 is in range of the service port 100. In this description, the receptacle 200 and plug 502 are collectively referred to as a "service coupling".

It is within the scope of the invention to mount the connectivity device 500 to a different part of the vehicle 12, or to mount the receptacle 200 to a different part of the service terminal 14. For example, the receptacle 200 and associated recess opening 108 may be placed on the top of the housing 101, as shown in FIG. 20, to receive a vertically deployed connectivity device 500. It is also within the scope of the invention to locate the connectivity device 500 on the wheel stop service port 100, and locate the receptacle 200 on the vehicle 12; in such case, the connectivity device 500 extends from the wheel stop service port 100 to couple to the vehicle. 12 when the vehicle 12 is in close proximity to the wheel stop service port 100.

The major components of the connectivity device 500 are the plug 502 for coupling to the receptacle 200 of the service terminal 14, a compliant member 504 attached at one end to the plug 502, a deployment apparatus 510 attached to the compliant member 504 for deploying the plug 502 from a stored position into a deployed position and retracting same back into the stored position, and a vehicle mounting assembly 512 attached to the deployment apparatus 510 and couplable to the underside of the vehicle 12.

Referring now to FIGS. 10 to 13, the major components of the receptacle 200 are a service engagement portion comprising the fluid exchange interface 202 and the electricity exchange interface 204, a cover assembly 246, a plug clamping assembly 207, and a cover drive assembly 209.

Figure 12:
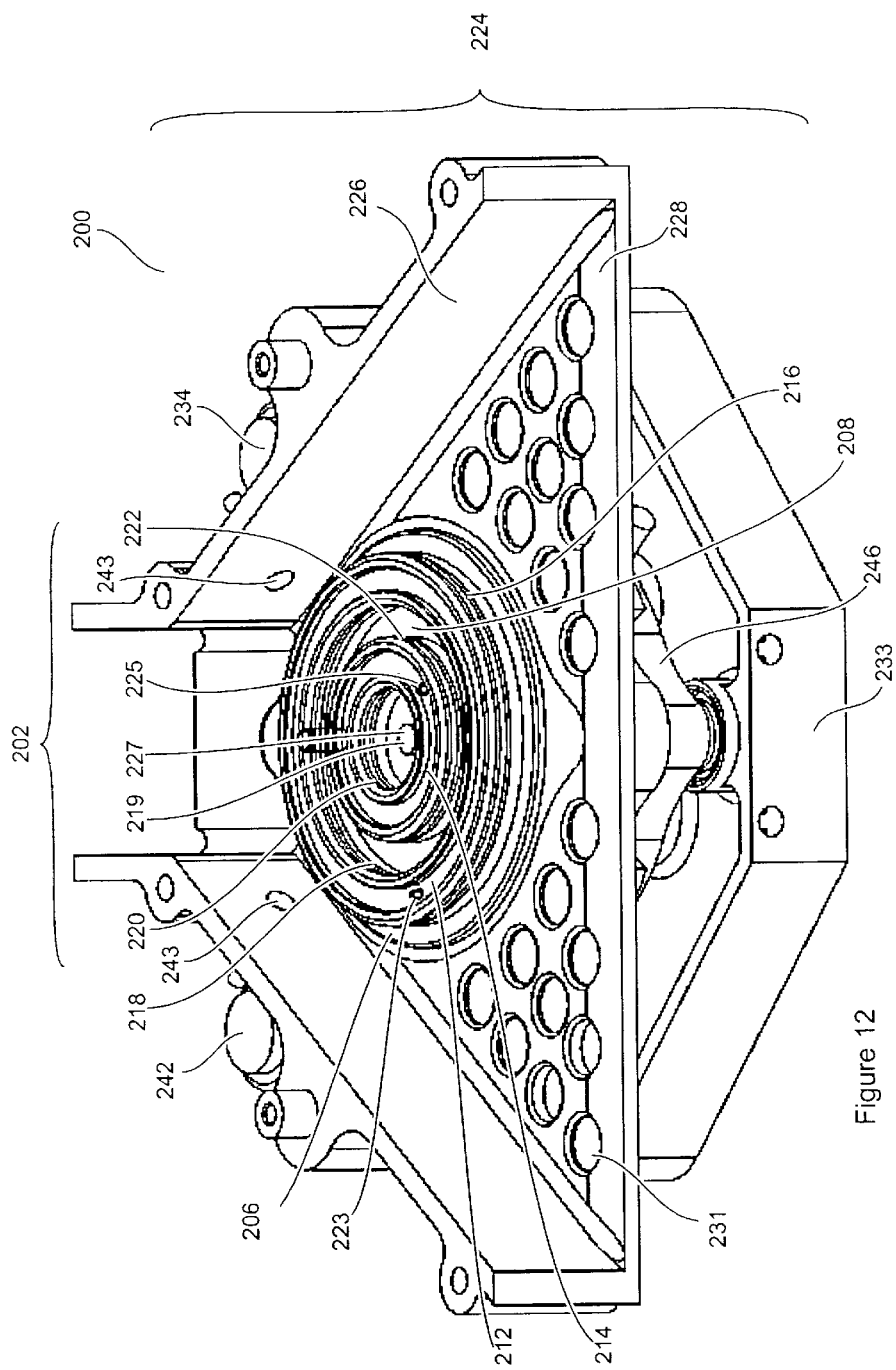
FIG. 12 is a perspective view of a lower assembly of the receptacle.
Figure 13:
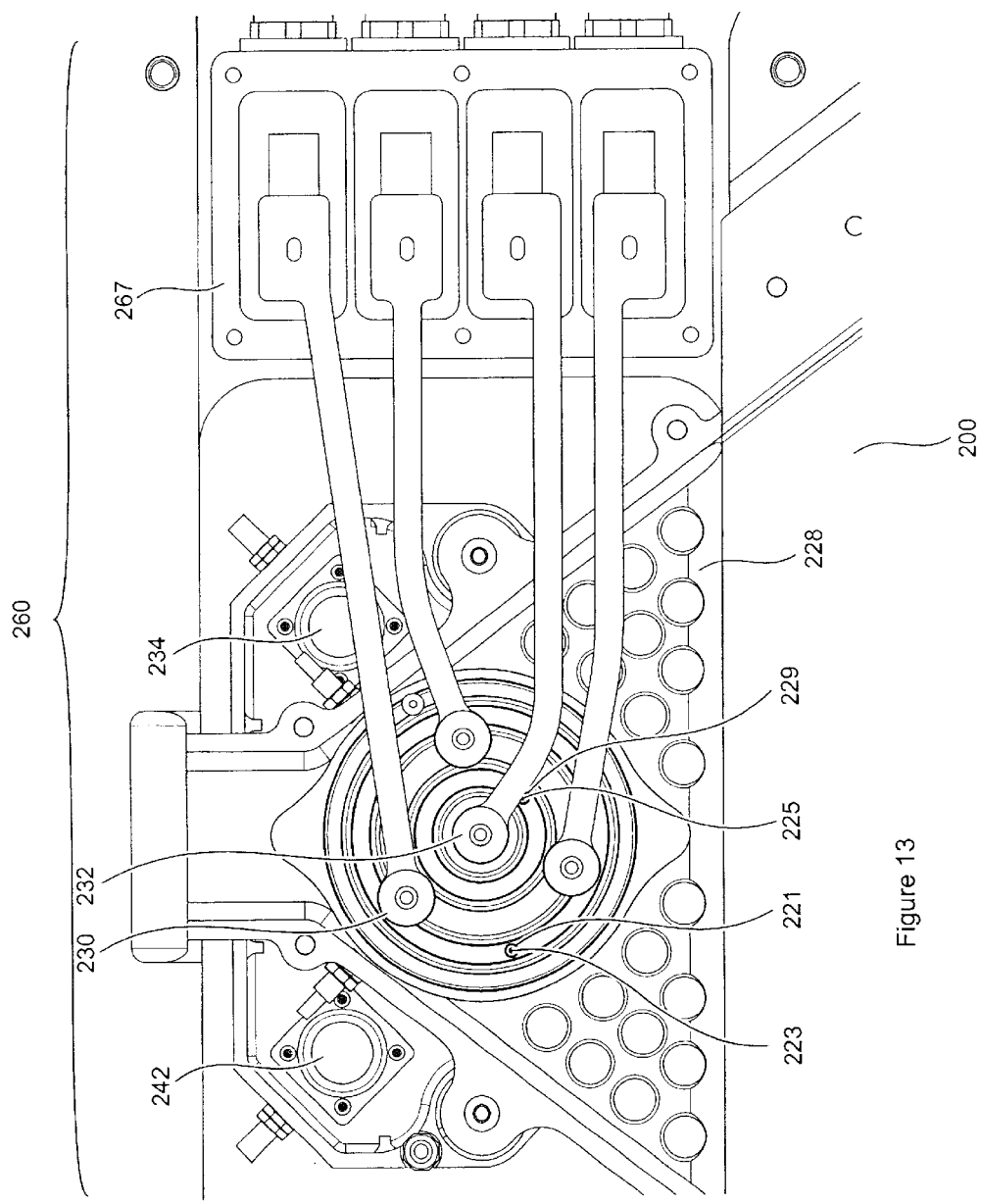
FIG. 13 is a top plan view of portions of the receptacle, including the electrical exchange interface.

Referring particularly to FIGS. 12 and 13, the receptacle fluid exchange interface 202 has a topography that corresponds to the topography of a fluid exchange interface on the plug (not shown). The receptacle fluid exchange interface 202 has receptacle fluid supply and drain lands 212, 214 that mate with respective plug fluid supply and drain channels (not shown), and receptacle channels 206, 208 that mate with plug lands (not shown) of the plug 502. The receptacle fluid supply land 206 is provided with inner and outer O-rings 216, 218 and receptacle fluid drain land 208 is provided with inner and outer O-rings 220, 222 to provide a fluid seal when the plug and receptacle fluid exchange interfaces 202 are engaged. The receptacle fluid supply land 206 has a fluid supply port 223 biased closed by a poppet valve assembly, and the receptacle fluid drain land 214 has a fluid drain port 225 also biased closed by a poppet valve assembly. A hydrogen cavity 227 is provided at the inner center portion of the receptacle fluid interface 202 with a hydrogen exchange port 219 biased closed by a poppet valve assembly. Fluid conduits (not shown) extend inside the receptacle; 200 and through the service port housing to couple the fluid supply and drain ports 223, 225 with the fluid conduit port 117 at the back of the housing 101.

The receptacle fluid exchange interface 202 is part of a larger receptacle lower assembly 224. The lower assembly 224 is provided with wheel stop housing anchor nuts (not shown) that attach the lower assembly 224 to the rest of the wheel stop service port 100, and mounting screws to attach the lower assembly to a receptacle upper assembly 260. The lower assembly 224 also includes tapered walls 226, and a dimpled floor 228. The tapering of the walls 226 guide the plug 502 into place, i.e. so that the plug and receptacle fluid and electricity exchange interfaces overlap. Dimples 231 in the floor 228 collect unwanted foreign matter. Underneath the floor 228 is a receptacle drive case 233 that holds plug clamping assembly 207 and the cover drive assembly 209.

The plug clamping assembly 207 includes a clamp actuation motor 234, a drive belt 236 connected to the motor 234, a sprocket assembly 238 connected to the belt 236, and a clamp activation screw 240 connected to the sprocket assembly 238. The receptacle fluid exchange interface 202 is vertically movably mounted to the receptacle lower assembly, and is vertically movable by the activation screw 240 connected to the bottom of the fluid exchange interface 202. A plurality of proximity sensors 241 are provided to detect the position of the receptacle fluid exchange interface 202, and in particular, when the receptacle fluid exchange interface has contacted the plug fluid exchange interface (not shown) ("puck engaged proximity" sensors). Such sensors 241 are conventional, and may be for example, an OMRON 8mm barrel inductive proximity sensor (OMRON E2F-X1R5E1). One or more proximity sensors 243 or contact switches may be installed at the back of the receptacle to detect when the plug 502 has been inserted in the receptacle 200 and is in place for coupling ("puck docked a proximity" sensors) and may be for example, a barrel inductive proximity sensor. The clamping force may be monitored by using a clamping force proximity sensor such as a barrel inductive proximity sensor. The operation of the motor may also be monitored by a receptacle motor current sensor (not shown) such as a CUI Stack Inc. SCD5PSR.

Figure 10:
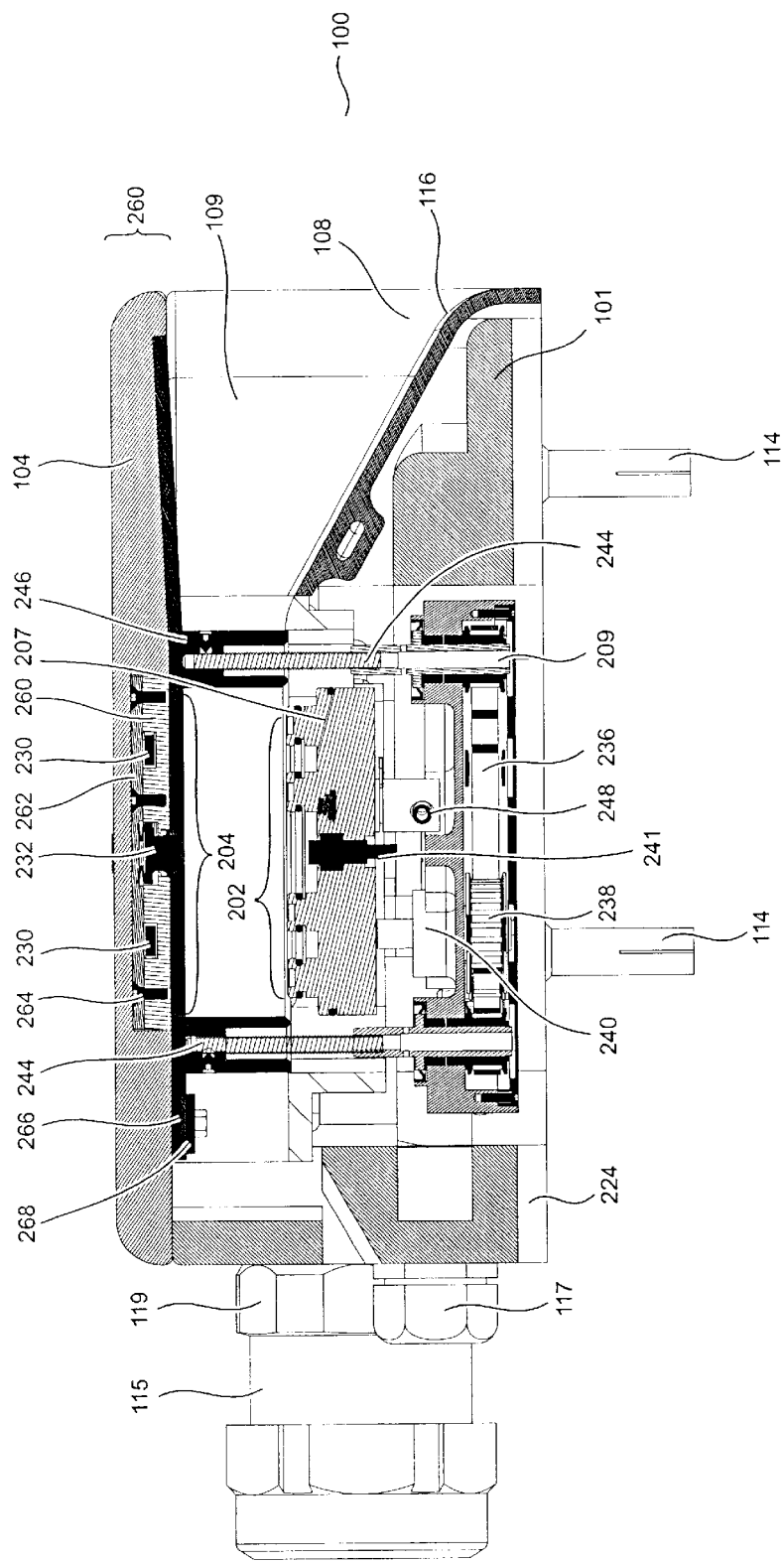
FIG. 10 is a sectional side elevation view of the wheel stop service port.
Figure 11:
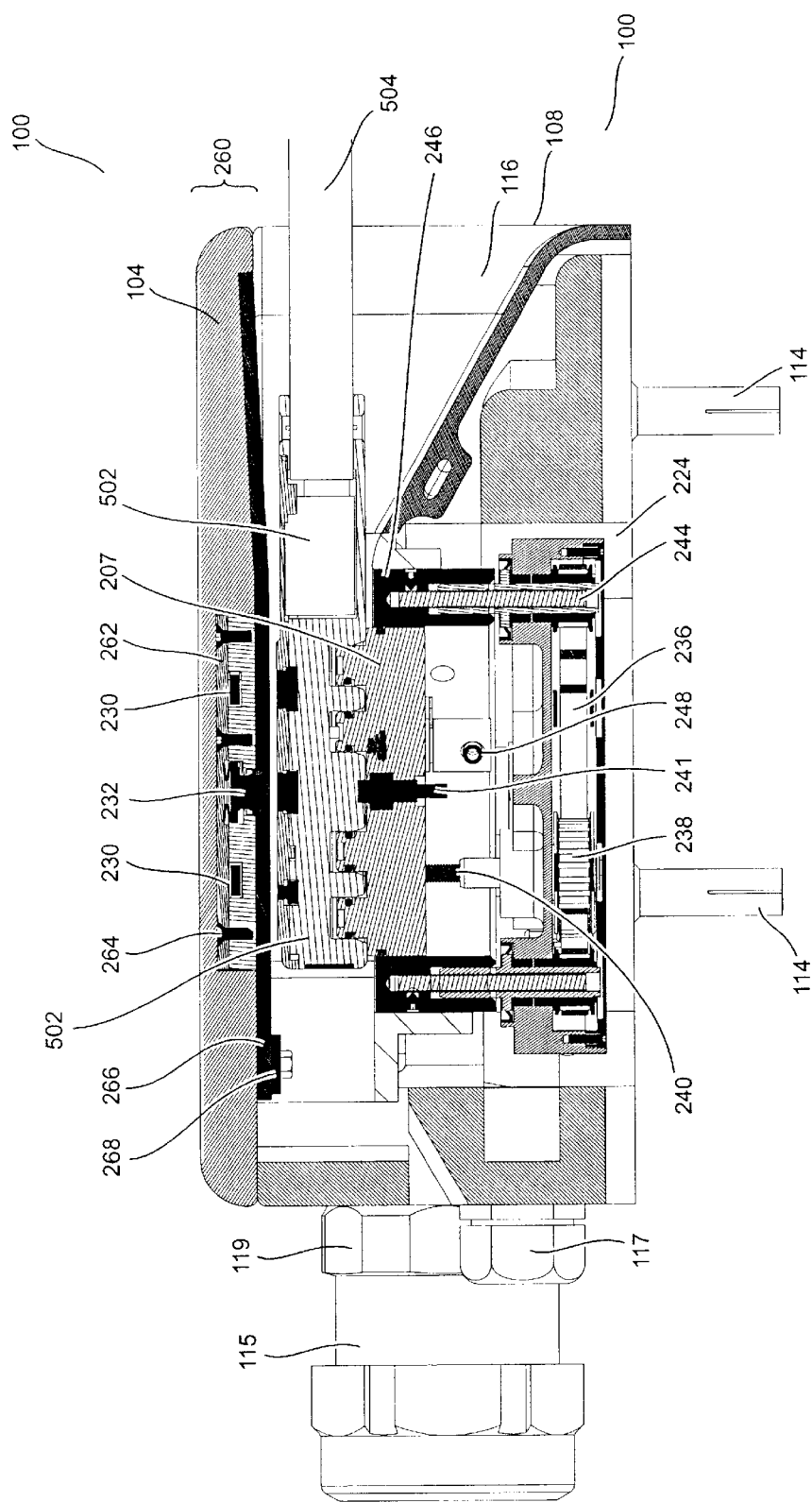
FIG. 11 is a sectional side elevation view of the receptacle of the wheel stop service port coupled with the plug.

The cover drive assembly 209 includes a cover actuation motor 242, a drive belt (not shown) connected to the motor 242, a cover sprocket assembly (not shown) connected to the belt, and a cover activation screw 244 connected to the sprocket assembly. The cover activation screw 244 is connected to an annular cover 246 that surrounds the outer periphery of the receptacle fluid exchange interface. The cover 246 is vertically movably mounted to the lower assembly 224; as can be seen in FIGS. 10 and 11, the motor 242 can be activated to raise and lower the cover 246. The cover 246 is raised when the receptacle 200 is empty, and lowered to allow the plug 502 to enter into the receptacle 200. A plurality of sensors 248 are provided to detect: when the cover is fully raised or fully retracted (cover down proximity sensor), the motion of the cover (cover pulse counter sensor), and the current of the cover motor 242 (cover motor current sensor). Such sensors 248 are conventional and may be for example an OMRON E2F-XR5E1 for the cover down proximity sensor, a Micronas HAL300 for the cover pulse counter sensor, and a CUI Stack Inc. SCD5PSR,for the cover motor current sensor.

The receptacle electricity exchange interface 204 has a circular shape that corresponds to an electricity exchange interface on the plug (not shown). The surface of the electricity exchange interface 204 has three contact openings equidistant from the center of the electricity exchange interface 204 and a ground opening at the center of the electricity exchange interface 204. Each electrical contact 230 has a butt engagement end that extends through each contact opening and a body that is coupled to the electrical conduit junction 115. Similarly, a ground contact 232 has a butt engagement end that extends through the ground opening and a body that is coupled to a grounded electrical connector (not shown). The electrical and ground contacts 230, 232 may be sprung by a disk spring that biases the contacts 230, 232 through the openings to enhance the contact between the receptacle contacts 230, 232 and the plug contacts (not shown) when the plug 502 is coupled with the receptacle 200. Alternatively, the spring may be a conical washer or Belleville washer. The receptacle electrical and ground contacts 230, 232 may be made from a long strip of copper bus bar that is free to move in the upper receptacle assembly 260 to provide sufficient flexibility to allow the receptacle contacts 230, 232 to move upon contact with the plug contacts (not shown).

Referring again to FIGS. 10, 11 and 13, the receptacle upper assembly 260 includes a receptacle upper assembly frame 262, the receptacle electricity exchange interface 204 attached to the bottom face of the frame 262 by mounting screws 264, an elastomeric contact seal 266 mounted to the frame 262 by mounting bolts 268, electrical contact junction box 267 physically attached to the frame 262 and electrically connected to the electrical contacts, and means to attach the frame 262 to the cover panel 104, e.g. screws. The junction box 267 is coupled to electrical cables which in turn are coupled to the electrical conduit junction 115 at the back of the housing 101. The elastomeric contact seal 266 is biased downwards and provides protection to the electrical and ground contacts when the receptacle 200 is uncoupled. The elastomer contact seal 266 may have a dimpled exterior surface pattern; under compression, this surface pattern may cause water and other liquids to accumulate within the dimples, thereby leaving the raised surface portions dry. As such, safety may be enhanced by keeping the electrical contacts dry.

The service port controller 34 controls a number of components of the service port 100 including the fluid valves 221, 219, the clamp and cover actuation motors 234, 232, and receives input data from the suite of sensors 241, 248. In this connection, the signal conduit 38 coupled to the service port controller 34 is coupled to a DC Signal conduit junction 119 at the back of the housing 101. The signal conduit junction 119 is in turn electrically connected to connectors that transmit control signals to and from the fluid and valves 221, 229, a hydrogen valve (not shown), clamp actuation motor 234, the cover actuation motor 242 and the suite of sensors as described above.

Figure 15:
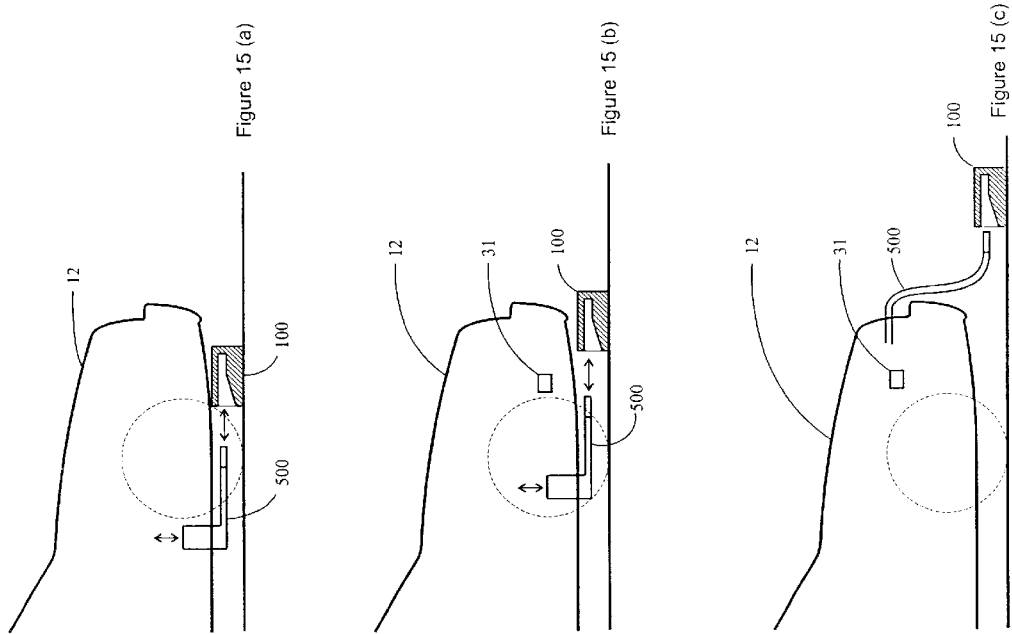

Referring to FIGS. 14 and 15(*a*), a coupling between the plug 502 and receptacle 200 is established as follows: The vehicle 12 is driven into a service port docking position and parked such that the front wheels of the vehicle 12 make contact with the wheel stop housing 101. Markings may be provided on a wheel contact surface portion 103 of surface of the housing 101 or elsewhere on the service terminal 14 to provide a visual guide for the driver to park the vehicle 12 so that the wheels contact the wheel contact surface 103. The wheel contact surface 103 is located on the housing surface su c h that the aligning of the wheels with the wheel contact portion aligns the connectivity device 500 with the recess opening 108. Control electronic s in the vehicle controller 30 and service port controller 34 then determine whether the wheel stop service port 100 and the connectivity device 500 have achieved a complete, proper and safe connection before enabling any transfer of services across the coupled connection.

Alternatively, the vehicle 12 has active sensing electronics that position the vehicle 12 in a relative location that does not contact the wheel stop housing 101 but is within coupling range of the connectivity device 500 (see FIG. 15(*b*)). In FIG. 15(*c*), the end of the vehicle 12 is parked ahead of the wheel stop housing 101 such that the recess opening 108 is accessible for manual connection, and the connectivity device 500 is extended from the vehicle 12 to the recess opening 108. In the embodiments shown in FIGS. 15(*b*) and 15(*c*), a vehicle-guidance transmitter or transponder 31 is used to determine the parked position of the vehicle 12 in a fixed relative coupling distance to the wheel stop housing 101.

When the service port controller 34 determines that the vehicle 12 is in range for coupling and other conditions for coupling have been met, (e.g. the vehicle user has been approved for exchanging services with the service terminal 14), the controller 34 activates the cover actuation motor 242, which lowers the cover 246.

Then, the connectivity device 500 is deployed from the vehicle 12 towards the recess opening 108. The connectivity device 500 is extended until the plug 502 enters the receptacle 200 and contacts the back of the receptacle 200. When the receptacle proximity sensor detects that the plug 502 has been inserted, the clamp actuation motor 234 is activated, and the receptacle fluid exchange interface 202 is raised until contact is established between the plug fluid exchange interface (not shown) and the receptacle fluid exchange interface 202. The receptacle fluid exchange interface 202 continues to rise until the plug electricity exchange interface (not shown) is brought into contact with the receptacle electricity exchange interface 204 and the elastomeric contact seal 266 of the receptacle electricity exchange interface 204 is compressed thereby exposing the electrical and ground contacts 230, 232, and the plug electrical and ground contacts (not shown) engage the receptacle electrical and ground contacts 230, 232. A proximity sensor 241 detects when the plug and receptacle interfaces are fully engaged, and directs the clamp actuation motor 234 to stop. The clamping force exerted should be sufficient to enable the transfer of fluids at pressures of about 12,000 psig, and up to 40,000 psig.

Referring again to FIGS. 11 and 13, when fully engaged, respective plug and receptacle hydrogen supply and drain valves (not shown) and fluid supply and drain valves 221, 229 on the plug 502 open; the opening may be caused by physical contact between plug 502 and receptacle 200 that displaces the valve into an open position, or, the valve assembly may include a solenoid electrically connected to and controlled by the service port controller 34 to open and close the valve. Supply fluid flows from the wheel stop service port 400 to the connectivity device 500 via the fluid supply port 223, and drain fluids drain from the vehicle 12 to the connectivity device via the fluid drain port 225. Also, hydrogen may be transferred between the vehicle 12 and connectivity device 500. Also, when fully engaged, electrical contact between the plug contacts (not shown) and receptacle contacts 230 are established, and electricity can be bi-directionally transferred between the wheel stop service port 100 and the connectivity device 500.

When the vehicle 12 and/or connectivity device 500 is perfectly aligned with the wheel stop service port 100, the connectivity device 500 passes through the middle of the connection bay 116 without contacting the tapered walls 122, 226 and the plug 502 enters directly into the receptacle 200. However, if the vehicle 12 is not perfectly aligned but still within range of the connection bay 116, a service connection may still be established where (1) means are provided to actively move the connectivity device 500 into alignment ("active docking means"), or where active docking means are hot provided, (2) the plug 502 is designed with arcuate service engagement portions that maintain engagement with the receptacle engagement portions when the plug 502 is rotated about the axis and within the arc-length of the arcuate engagement portion.

The connectivity device 500 is within range of the connection bay 116 when the connectivity device 500 can be deployed from the parked vehicle 12 such that the plug 502 can be extended through the connection bay opening and guided into the receptacle 200. As noted above, the connectivity device 500 is perfectly aligned when the plug 502 can be inserted directly into the receptacle 200 without contacting any of the walls of the connection bay 116. When the connectivity device 500 is not perfectly aligned but still within range of the connection bay 116, the deployment of the plug 502 causes the plug 502 to first encounter one of the tapered walls of the connection bay 116. Upon further deployment, the compliance of the connectivity device 500 enables the connectivity device 500 to flex so that the plug 502 is guided into the receptacle 200. Deployment of the connectivity device 500 continues until the plug 502 is fully inserted inside the receptacle 200 (i.e. contacts the back wall of the receptacle 200).

FIG. 16 illustrates a cross-sectional view of a wheel stop housing 101 showing a cleaning apparatus 194 that is attached to the tapered walls 122 of the connection bay 116 and protrude into the space where the connectivity device 500 passes through during docking with the service port 100. During docking of the connectivity device 500, the service plug 502 rubs past the cleaning apparatus 194 such that the cleaning apparatus 194 removes moisture, pollution, road dirt or other foreign substance that may be adhering to the plug 502 and connectivity device 500. In one embodiment, the cleaning apparatus 194 is mounted at the mouth of the receptacle 200 or on cover 246. The cleaning apparatus 194 may suitably be brushes, elastomeric digits, or other substance that adequately removes potentially adhering foreign substances, without damaging the surfaces of the connectivity device 500 during connection or disconnection.

Referring to FIG. 17, and according to another embodiment of the invention, components of the service port 100 and the service conduit 36 may incorporate a heating apparatus 150 to protect the service conduit 36 and fluid conduits and connections inside the service port 100 from freezing, to melt any snow that might fall on the service port 100 and to keep frost or ice from forming on the service port 100 and interfering with port functions.

The heating apparatus 150 includes a heat exchanger (not shown) in proximity to the components to be heated. The heat exchanger has a supply line 154 and return line 156 fluidly coupled to respective heating water supply and return connectors (not shown). The fluid may be water or a glycol solution or any other suitable heat transfer fluid as known in the art. Using hot water as an exemplary heating fluid, the supply and return lines 154, 156 are also coupled to a facility hot water source 152 such as a hot water tank at the service terminal 14. Fluid pump 155 is fluidly coupled to the supply line 154 to regulate the flow of hot water supplied to components of the service port 100 and the port service conduit 36. Valves (not shown) may be provided on one or both of the supply and return lines 154, 156 to control the flow of heating fluid to components of the service port 100 and the port service conduit 36. Operation of the heating apparatus 150 is controlled by the service port controller 34 via input and signal connectors, namely return line signal cable 158 connected to a temperature transducer 157, and a signal cable 162 connected to the pump 155 and water source signal cable 160 connected to the hot water source 152.

According to another embodiment of the invention, electrical heat tracing may be incorporated into the service port 100 to keep components of the service port from freezing. Such heat tracing is known in the art and can for example include a resistive heating wire wrapped around a fluid conduit and electrically connected to an electrical power source.

Referring to FIGS. 18(*a*) to (*c*) and according to another embodiment of the invention, one or more docking guides 170, 171, 173 may be affixed to the service port 100 to guide a vehicle 12 to a position relative to the service port 100 that puts the connectivity device 500 in range to couple to the service port 100. In particular, the docking guides 170, 171, 173 guide a wheel 169 of the vehicle 12 to contact the wheel contact surface 103 on the housing 101 such that the vehicle 12 is in an appropriate lateral position relative to the service port 100. The guide may suitably be one or a pair of raised rails 170 that is mounted to the ground orthogonally to the service port 100 (FIG. 18(a)). Contact by the wheel of the vehicle 12 with one or both of the rails provides feed back to the driver and enables the driver to position the vehicle in a couplable position to the service port 100. Alternatively, the docking guide may be a series of raised bumps 171 (FIG. 18(b)) or an elongate groove 173 (FIG. 18(c)) positioned orthogonally to the service port.

Referring to FIGS. 19(a) to (c), and according to another embodiment of the invention, the service port 100 is movably mounted to a housing deployment apparatus that moves the service port 100 between an operative position and an inoperative position. For example, and as illustrated in FIG. 19(a), an open-faced channel 176 is provided in the parking surface that corresponds to the service port 100. A frame 178 is fixed inside the channel 176, and the service port 100 is vertically slidably mounted to the frame 178. A motor assembly 180 having a motor and drive screw 184 is located inside the channel 176. The motor may be electric, or a pneumatic or hydraulic actuator. The drive screw 184 is rotatably attached to the housing 101 and can raise and lower the housing 101 by clockwise and counter-clockwise rotation. The motor is communicative with the service port controller 34 via signal cable (not shown). The port controller 34 controls the motor to deploy the service port 100 into a raised position above ground level to enable the service port 100 to couple to the connectivity device 500 of a vehicle 12. When the vehicle 12 is to be driven away, the controller 34 controls the motor to lower the service port 100 into the channel 176 such that the top surface of the housing 101 is flush with the ground surface. Alternatively and as shown in FIG. 19(b), the service port 100 may be pivotably attached to the frame 178, which is located above ground to the side of the parking stall in which the service port 100 is installed. The motor assembly 180 pivots the service port 100 between an operative (transversely positioned in the parking stall) for coupling with the connectivity device 500, and an inoperative position (longitudinally positioned in the parking stall) to enable the vehicle 12 to drive through the parking stall. Alternatively as shown in FIG. 19(c), the service port 100 can be slidably mounted to the frame such that the motor assembly moves the service port sideways out of the parking stall.

Referring to FIGS. 21(a) and (b) and according to an alternative embodiment of the invention, the service port 100 has a modular design with two modules, namely an integrated service port module 300 and a housing module 302. The integrated service port module 300 includes the receptacle 200, the service conduit junctions 115, 117, 119. The housing module 302 resembles the housing 101 discussed above, but with a recess that is modified to enable the housing module 302 to slide over the integrated service port module 300 and connected service conduits 34. Such a design enables the housing module to be easily replaced without having to unfasten the integrated service port module 302 and connected service conduits 34 from the parking surface. The housing and service port are mechanically coupled by means known in the art, such as latches or snap fit.

Alternatively, and as shown in FIG. 21(b), the recess may be configured to receive the integrated service port module 300 from the top, thereby enabling the integrated service port module 300 to be easily removable from the housing module 302.

In another embodiment, the wheel stop service port 100 may be designed mechanically to operate after freezing without damage. Such freezing may occur for example, when the heat tracing or heat transfer circuit has failed. A freeze-tolerant design may include the use of elastomeric tubing and fittings which will not be damaged by freezing.

In another embodiment, a protective door(s) or flap(s) (not shown) attached to the front of the connection bay 116 is provided; such door or flap may be activated and de-activated by gravity, mechanical spring, magnet, motor or similar methods, and activated either at the service terminal 14 or remotely by the vehicle 12.

In another embodiment, electrical power filter(s) (not shown) are added at the service port controller 34 to enable bi-directional electricity transfer. Such filters (not shown) are required for distributing power back to the electrical power grid from the vehicle 12.

In another embodiment, an optional bi-directional electricity meter (not shown) may be mounted in the housing 101 and connected to the port service conduit 36 to measure and/or report the amount of electricity transferred to or from the vehicle 12. The meter (not shown) may be connected to the port controller 34 through a data line or wireless data link.

While the preferred embodiment of the invention has been illustrated and described, it will be appreciated that various changes can be made therein without departing from the scope and spirit of the invention.

What is claimed is:

1. A service port for coupling to a connectivity device of a wheeled vehicle such that one or more services, namely electricity, data, and fluids, are transferable therebetween, the service port comprising:
   (a) a receptacle comprising an opening shaped to receive a service plug of a vehicle connectivity device, and a service engagement portion inside the receptacle for engaging a corresponding service engagement portion of the service plug;
   (b) a service conduit junction coupled to the receptacle and couplable to a service conduit to enable the transfer of a service therebetween; and
   (c) a wheel contact surface located relative to the receptacle such that when a wheel of a vehicle contacts the contact surface, the connectivity device of the vehicle is within coupling range of the service port.

2. The service port of claim 1 further comprising a housing with a recess in which the receptacle is located, the recess having a recess opening on an outside surface of the housing for receiving the plug, and wherein a portion of the outside surface of the housing is the wheel contact surface.

3. The service port of claim 2 wherein the housing further comprises fasteners on the housing for fastening the service port to a parking surface.

4. The service port of claim 3 wherein the housing further comprises a connection bay in the recess between the recess opening and the receptacle, the connection bay having tapered walls tapering from the recess opening to the receptacle opening.

5. The service port of claim 4 wherein the receptacle and connection bay are made of materials including an electrically insulating material.

6. The service port of claim 4 wherein the housing has a width selected to correspond to the wheel track of the vehicle.

7. The service port of claim 6 wherein the housing has a height that enables the front overhang of the vehicle to clear the housing such that the front wheels of the vehicle can contact the wheel contact surface.

8. The service port of claim 4 further comprising a cleaning apparatus mounted to the connection bay such that the cleaning apparatus contacts the plug passing through the connection bay, the contact serving to remove unwanted material from the plug.

9. The service port of claim 4 further comprising a connection bay door movably mounted to the connection bay.

10. The service port of claim 2 further comprising a lateral vehicle guide mountable to the parking surface relative to the housing such that contact between a wheel of the vehicle and the vehicle guide guides the vehicle to a lateral position on the wheel stop contact surface suitable for coupling.

11. The service port of claim 10 wherein the lateral vehicle guide is a raised rail.

12. The service port of claim 10 wherein the lateral vehicle guide comprises a plurality of spaced bumps.

13. The service port of claim 10 wherein the lateral vehicle guide is an elongated groove.

14. The service port of claim 2 further comprising a housing deployment motor assembly connected to the housing to move the housing between an operative position and an inoperative position.

15. The service port of claim 14 wherein the housing is pivotably mounted to the motor assembly such that the motor assembly pivots the housing between an operative position and an inoperative position.

16. The service port of claim 14 wherein the housing is vertically slidably mounted to the motor assembly such that the motor assembly raises the housing into an operative position and retracts the housing into an inoperative position.

17. The service port of claim 2 wherein the receptacle and service conduit junction are located in an integrated module, and the recess is configured to receive the integrated module such that the integrated module is removably mounted to the housing wherein one of the housing and integrated module can be removed from the other of the housing and integrated module without the other being unfastened from the parking surface.

18. The service port of claim 2 wherein the housing has a front, back and top surface, and the recess opening is located on one of these surfaces.

19. The service port of claim 2 further includes a service port controller located inside the housing, and electrically communicative with the receptacle.

20. The service port of claim 18 wherein the recess opening and wheel contact surface are located on the front surface of the housing, and the service port further comprises (a) a second recess with a recess opening located on the back surface of the housing, (b) a second receptacle inside the second recess, and (c) a second wheel contact surface located on the back surface of the housing such that when a wheel of a vehicle contacts the second wheel contact surface, the connectivity device of the vehicle is within coupling range of the second receptacle.

21. The service port of claim 1 wherein the service conduits include fluid conduits, and the service port further comprises a heat transfer fluid circuit thermally coupled to at least one the fluid conduits, service conduit junction, and receptacle.

22. The service port of claim 1 wherein the service conduits include fluid conduits, and the service port further comprises a heat tracing electrical circuit thermally coupled to at least one the fluid conduits, service conduit junction, and receptacle.

23. The service port of claim 1 further comprising a service port status indicator electrically coupled to the service conduit junction.

24. The service port of claim 1 wherein the service conduit includes an electrical conduit for transferring electricity between the service port and an electricity grid and the service port further comprises a power filter electrically couplable to the service conduit.

25. The service port of claim 1 wherein the service conduit includes an electrical conduit and the service port further includes a bi-directional electricity meter electrically couplable to the electrical conduit to measure the electricity transmitted through the electrical conduit.

26. A service port for coupling to a connectivity device of a wheeled vehicle such that one or more services, namely electricity, data, and fluids, are transferable therebetween, the service port comprising:

(a) a housing comprising a receptacle recess with a recess opening on an outside surface of the housing;

(b) a receptacle inside the recess and comprising an opening shaped to receive a service plug of a vehicle connectivity device, and a service engagement portion inside the receptacle for engaging a corresponding service engagement portion on the plug;

(c) a connection bay inside the recess between the receptacle and the recess opening, the connection bay having tapered walls tapering from the recess opening to the receptacle;

(d) a service conduit junction coupled to the receptacle and couplable to a service conduit to enable the transfer of a service therebetween; and (e) a wheel contact surface located on the housing outside surface such that upon contact of the contact surface by a wheel of a vehicle, the connectivity device of the vehicle is within coupling range of the service port.

27. The service port of claim 26 further comprising a fastener on the housing for fastening the service port to a parking surface.

28. The service port of claim 26 wherein the receptacle and connection bay are made of materials including an electrically insulating material.

29. The service port of claim 26 wherein the housing has a width selected to correspond to the wheel track of the vehicle.

30. The service port of claim 29 wherein the housing has a height that enables the front overhang of the vehicle to clear the housing such that the front wheels of the vehicle can contact the wheel contact surface.

31. The service port of claim 26 further comprising a lateral vehicle guide mountable to the parking surface and relative to the housing such that contact between a wheel of the vehicle and the vehicle guide guides the vehicle to a lateral position on the wheel stop contact surface suitable for coupling.

32. The service port of claim 31 wherein the lateral vehicle guide is a raised rail.

33. The service port of claim 31 wherein the lateral vehicle guide comprises a plurality of spaced bumps.

34. The service port of claim 31 wherein the lateral vehicle guide is an elongated groove.

35. The service port of claim 26 further comprising a housing deployment motor assembly connected to the housing to move the housing between an operative position and an inoperative position.

36. The service port of claim 35 wherein the housing is pivotably mounted to the motor assembly such that the motor assembly pivots the housing between an operative position and an inoperative position.

37. The service port of claim 35 wherein the housing is vertically slidably mounted to the motor assembly such that the motor assembly raises the housing into an operative position and retracts the housing into an inoperative position.

38. The service port of claim 26 wherein the service conduits include fluid conduits, and the service port further comprises a heating fluid transfer circuit thermally coupled to at least one the fluid conduits, service conduit junction, and receptacle.

39. The service port of claim 26 wherein the service conduits include fluid conduits, and the service port further comprises a heat tracing electrical circuit thermally coupled to at least one the fluid conduits, service conduit junction, and receptacle.

40. The service port of claim 26 further comprising a service port status indicator electrically coupled to the service conduit junction.

41. The service port of claim 26 further comprising a cleaning apparatus mounted to the connection bay such that the cleaning apparatus contacts the plug passing through the connection bay, the contact serving to remove unwanted material from the plug.

42. The service port of claim 26 further comprising a connection bay door movably mounted to the connection bay.

43. The service port of claim 26 wherein and the recess is configured to receive the integrated module such that the integrated module is removably mounted to the housing wherein one of the housing and integrated module can be removed from the other of the housing and integrated module without the other being unfastened from the parking surface.

44. The service port of claim 26 wherein the housing has a front, back and top surface, and the recess opening is located on one of these surfaces.

45. The service port of claim 26 wherein the service conduit includes an electrical conduit for transferring electricity between the service port and an electricity grid and the service port further comprises a power filter electrically couplable to the service conduit.

46. The service port of claim 26 wherein the service conduit includes an electrical conduit and the service port further includes a bi-directional electricity meter electrically couplable to the electrical conduit to measure the electricity transmitted through the electrical conduit.

47. The service port of claim 26 further includes a service port controller located inside the housing, and electrically communicative with the receptacle.

* * * * *

UNITED STATES PATENT AND TRADEMARK OFFICE
CERTIFICATE OF CORRECTION

PATENT NO. : 6,619,342 B2
DATED : September 16, 2003
INVENTOR(S) : John David Trevor Graham et al.

It is certified that error appears in the above-identified patent and that said Letters Patent is hereby corrected as shown below:

<u>Title page,</u>
Item [73], Assignee reads "General Hydrogen Corporation (Richmond, CA)" should read -- General Hydrogen Corporation, Seattle, WA (US) --

Signed and Sealed this

Eleventh Day of May, 2004

JON W. DUDAS
*Acting Director of the United States Patent and Trademark Office*